US012668319B2

(12) United States Patent
Moreau et al.

(10) Patent No.: US 12,668,319 B2
(45) Date of Patent: Jun. 30, 2026

(54) WHEEL OF TRACK SYSTEM FOR TRACTION OF A VEHICLE

(71) Applicant: CAMSO INC., Magog (CA)

(72) Inventors: Serge Moreau, Magog (CA); Matthieu Bergeron, Sherbrooke (CA); Patrice Boily, Sainte-Catherine-de-Hatley (CA); Alexandre Laprise, Racine (CA)

(73) Assignee: Camso Inc., Magog (CA)

( * ) Notice: Subject to any disclaimer, the term of this patent is extended or adjusted under 35 U.S.C. 154(b) by 537 days.

(21) Appl. No.: 17/635,067

(22) PCT Filed: Aug. 12, 2020

(86) PCT No.: PCT/CA2020/051106
§ 371 (c)(1),
(2) Date: Feb. 14, 2022

(87) PCT Pub. No.: WO2021/026654
PCT Pub. Date: Feb. 18, 2021

(65) Prior Publication Data
US 2022/0289318 A1     Sep. 15, 2022

Related U.S. Application Data

(60) Provisional application No. 62/885,598, filed on Aug. 12, 2019.

(51) Int. Cl.
B62D 55/14        (2006.01)
B62D 55/24        (2006.01)

(52) U.S. Cl.
CPC ........... B62D 55/14 (2013.01); B62D 55/244 (2013.01)

(58) Field of Classification Search
CPC .... B62D 55/0966; B62D 55/14; B62D 55/24; B62D 55/244
(Continued)

(56) References Cited

U.S. PATENT DOCUMENTS 5,161,866 A  *  11/1992  Johnson ................. B62D 55/14
                                                305/136
5,352,029 A  *  10/1994  Nagorcka .............. B62D 55/12
                                                305/179
(Continued)

FOREIGN PATENT DOCUMENTS

CA          2508741          11/2006
CA          2899527 A1       2/2017
(Continued)

OTHER PUBLICATIONS

International Search Report and Written Opinion issued on Nov. 26, 2020 in connection with International patent application PCT/CA2020/051106, 9 pages.

*Primary Examiner* — S. Joseph Morano
(74) *Attorney, Agent, or Firm* — Hahn Loeser & Parks LLP

(57)                ABSTRACT
A wheel of a track system for traction of a vehicle (e.g., an agricultural vehicle) may be configured to protect a track of the track system by reducing stress induced in the track by the wheel. For example, a circumferential surface of the wheel may be uneven (e.g., curved) in a widthwise direction of the wheel (e.g., to have a crown) and/or a covering of the wheel may be asymmetrical about a midpoint of the covering in the widthwise direction of the wheel (e.g., include corners that are shaped differently).

17 Claims, 28 Drawing Sheets

(58) Field of Classification Search
   USPC .................................................. 305/136, 137
   See application file for complete search history.

(56)                         References Cited

U.S. PATENT DOCUMENTS

|               |      |         |                         |            |
|---------------|------|---------|-------------------------|------------|
| 6,890,042     | B2   | 5/2005  | Inaoka                  |            |
| 9,033,430     | B2*  | 5/2015  | Zuchoski et al. ............. | 305/137 |
| 10,266,218    | B2   | 4/2019  | Neyer et al.            |            |
| 10,710,652    | B2   | 7/2020  | De Brouwer              |            |
| 10,787,030    | B2   | 9/2020  | Taylor                  |            |
| 2015/0197294  | A1   | 7/2015  | Hakes                   |            |
| 2016/0288847  | A1   | 10/2016 | Neyer et al.            |            |
| 2017/0036714  | A1*  | 2/2017  | Lunkenbein ........... | B62D 55/14 |
| 2017/0106923  | A1*  | 4/2017  | Iwasaki ................. | B62D 55/14 |
| 2017/0166272  | A1*  | 6/2017  | Reshad .................. | B62D 55/14 |
| 2018/0170464  | A1*  | 6/2018  | De Brouwer .......... | B62D 55/10 |

FOREIGN PATENT DOCUMENTS

| CN  | 109278884  A | 1/2019  |
|-----|--------------|---------|
| JP  | 2002127955   | 10/2000 |
| WO  | 2021026654   | 2/2021  |

* cited by examiner

WHEEL OF TRACK SYSTEM FOR TRACTION OF A VEHICLE

CROSS-REFERENCE TO RELATED APPLICATION

This application is a National Phase Entry of International Application No. PCT/CA2020/051106 filed on Aug. 12, 2020, which claims priority from U.S. Patent Application 62/885,598 filed on Aug. 12, 2019. The contents of the above noted application are hereby incorporated by reference herein.

FIELD

This disclosure relates generally to off-road vehicles (e.g., agricultural vehicles or other industrial vehicles, etc.) and, more particularly, to track systems for traction of such vehicles.

BACKGROUND

Off-road vehicles, including industrial vehicles such as agricultural vehicles (e.g., tractors, harvesters, combines, etc.), construction vehicles (e.g., loaders, excavators, bulldozers, etc.), and forestry vehicles (e.g., feller-bunchers, tree chippers, knuckleboom loaders, etc.), military vehicles (e.g., combat engineering vehicles (CEVs), etc.), snowmobiles, and all-terrain vehicles (ATVs), may include track systems to enhance their traction and floatation on soft, slippery and/or irregular grounds (e.g., soil, mud, sand, ice, snow, etc.).

A vehicle's track system comprises a track movable around wheels that drive and guide the track and support loading. The wheels may sometimes present issues. For example, the wheels may sometimes induce stresses in the track that may be significant and damage or otherwise deteriorate the track. For instance, the track may include cables in its elastomeric material and the stresses caused by the wheels may detrimentally affect the cables, which may break by fatigue.

For these and other reasons, there is a need to improve wheels of track systems for traction of vehicles.

SUMMARY

In accordance with various aspects of this disclosure, a wheel of a track system for traction of a vehicle may be configured to protect a track of the track system by reducing stress induced in the track by the wheel. For example, in some embodiments, a circumferential surface of the wheel may be uneven (e.g., curved) in a widthwise direction of the wheel (e.g., to have a crown) and/or a covering of the wheel may be asymmetrical about a midpoint of the covering in the widthwise direction of the wheel (e.g., include corners that are shaped differently).

For instance, in accordance with an aspect, this disclosure relates to a wheel for a track system of a vehicle, the track system comprising a track-engaging assembly that includes the wheel and a track movable around the track-engaging assembly, the track being elastomeric to flex around the track-engaging assembly, the track comprising a ground-engaging outer surface for engaging the ground and an inner surface opposite to the ground-engaging outer surface. The wheel comprises: a first lateral side and a second lateral side opposed to one another; and a circumferential surface disposed between the first lateral side and the second lateral side and configured to contact the inner surface of the track. The circumferential surface comprises: a first lateral track-contacting portion adjacent to the first lateral side; a second lateral track-contacting portion adjacent to the second lateral side; and an intermediate track-contacting portion between the first lateral track-contacting portion and the second lateral track-contacting portion of the circumferential surface in a widthwise direction of the wheel and extending farther from an axis of rotation of the wheel than the first lateral track-contacting portion and the second lateral track-contacting portion of the circumferential surface in a radial direction of the wheel.

In accordance with another aspect, this disclosure relates to a wheel for a track system of a vehicle, the track system comprising a track-engaging assembly that includes the wheel and a track movable around the track-engaging assembly, the track being elastomeric to flex around the track-engaging assembly, the track comprising a ground-engaging outer surface for engaging the ground and an inner surface opposite to the ground-engaging outer surface. The wheel comprises: a first lateral side and a second lateral side opposite one another; and a circumferential surface disposed between the first lateral side and the second lateral side and configured to contact the inner surface of the track, the circumferential surface being curved in a widthwise direction of the wheel. The circumferential surface comprises: a first lateral track-contacting portion adjacent to the first lateral side; a second lateral track-contacting portion adjacent to the second lateral side; and an intermediate track-contacting portion between the first lateral track-contacting portion and the second lateral track-contacting portion of the circumferential surface in the widthwise direction of the wheel and extending farther from an axis of rotation of the wheel than the first lateral track-contacting portion and the second lateral track-contacting portion of the circumferential surface in a radial direction of the wheel.

In accordance with another aspect, this disclosure relates to a wheel for a track system of a vehicle, the track system comprising a track-engaging assembly that includes the wheel and a track movable around the track-engaging assembly, the track being elastomeric to flex around the track-engaging assembly, the track comprising a ground-engaging outer surface for engaging the ground and an inner surface opposite to the ground-engaging outer surface. The wheel comprises: a first lateral side and a second lateral side opposite one another; and a circumferential surface disposed between the first lateral side and the second lateral side and configured to contact the inner surface of the track, the circumferential surface being curved in a widthwise direction of the wheel. The circumferential surface comprises: a first lateral track-contacting portion adjacent to the first lateral side; a second lateral track-contacting portion adjacent to the second lateral side; and an intermediate track-contacting portion between the first lateral track-contacting portion and the second lateral track-contacting portion of the circumferential surface in the widthwise direction of the wheel and extending farther from an axis of rotation of the wheel than the first lateral track-contacting portion and the second lateral track-contacting portion of the circumferential surface in a radial direction of the wheel. The wheel comprises a body including a rim and a hub; the wheel comprises a covering affixed to the body of the wheel and including the circumferential surface; and a thickness of the covering varies in the widthwise direction of the wheel.

In accordance with another aspect, this disclosure relates to a wheel for a track system of a vehicle, the track system comprising a track-engaging assembly that includes the wheel and a track movable around the track-engaging assembly, the track being elastomeric to flex around the track-engaging assembly, the track comprising a ground-engaging outer surface for engaging the ground and an inner surface opposite to the ground-engaging outer surface. The wheel comprises: a first lateral side and a second lateral side opposite one another; and a circumferential surface disposed between the first lateral side and the second lateral side and configured to contact the inner surface of the track, the circumferential surface being uneven in a widthwise direction of the wheel. The wheel comprises a body including a rim and a hub; the wheel comprises a covering affixed to the body of the wheel and including the circumferential surface; and the covering is asymmetrical relative to a midpoint of the covering in the widthwise direction of the wheel.

In accordance with another aspect, this disclosure relates to a wheel for a track system of a vehicle, the track system comprising a track-engaging assembly that includes the wheel and a track movable around the track-engaging assembly, the track being elastomeric to flex around the track-engaging assembly, the track comprising a ground-engaging outer surface for engaging the ground and an inner surface opposite to the ground-engaging outer surface. The wheel comprises: a first lateral side and a second lateral side opposite one another; and a circumferential surface disposed between the first lateral side and the second lateral side and configured to contact the inner surface of the track. The wheel comprises a body including a rim and a hub. The wheel comprises a covering affixed to the body of the wheel and including the circumferential surface. The covering includes a first corner adjacent to the first lateral side of the wheel and a second corner adjacent to the second lateral side of the wheel that are shaped differently.

In accordance with another aspect, this disclosure relates to a wheel for a track system of a vehicle, the track system comprising a track-engaging assembly that includes the wheel and a track movable around the track-engaging assembly, the track being elastomeric to flex around the track-engaging assembly, the track comprising a ground-engaging outer surface for engaging the ground and an inner surface opposite to the ground-engaging outer surface. The wheel comprises: a first lateral side and a second lateral side opposite one another; and a circumferential surface disposed between the first lateral side and the second lateral side and configured to contact the inner surface of the track. The wheel is configured to generate less stress on the track at the first lateral side of the wheel than at the second lateral side of the wheel.

In accordance with another aspect, this disclosure relates to a wheel for a track system of a vehicle, the track system comprising a track-engaging assembly that includes the wheel and a track movable around the track-engaging assembly, the track being elastomeric to flex around the track-engaging assembly, the track comprising a ground-engaging outer surface for engaging the ground and an inner surface opposite to the ground-engaging outer surface, the wheel being configured to engage the inner surface of the track. The wheel comprises: a body including a rim portion and a hub portion; and a covering affixed to the body of the wheel and including a circumferential surface configured to engage the inner surface of the track, the covering being configured to reduce a maximal stress concentration on the track by at least 10%.

These and other aspects of this disclosure will now become apparent to those of ordinary skill in the art upon review of a description of embodiments in conjunction with accompanying drawings.

BRIEF DESCRIPTION OF THE DRAWINGS

A detailed description of embodiments is provided below, by way of example only, with reference to accompanying drawings, in which.

It is to be expressly understood that the description and drawings are only for purposes of illustrating certain embodiments and are an aid for understanding. They are not intended to and should not be limiting.

DETAILED DESCRIPTION OF EMBODIMENTS

Figure 1:
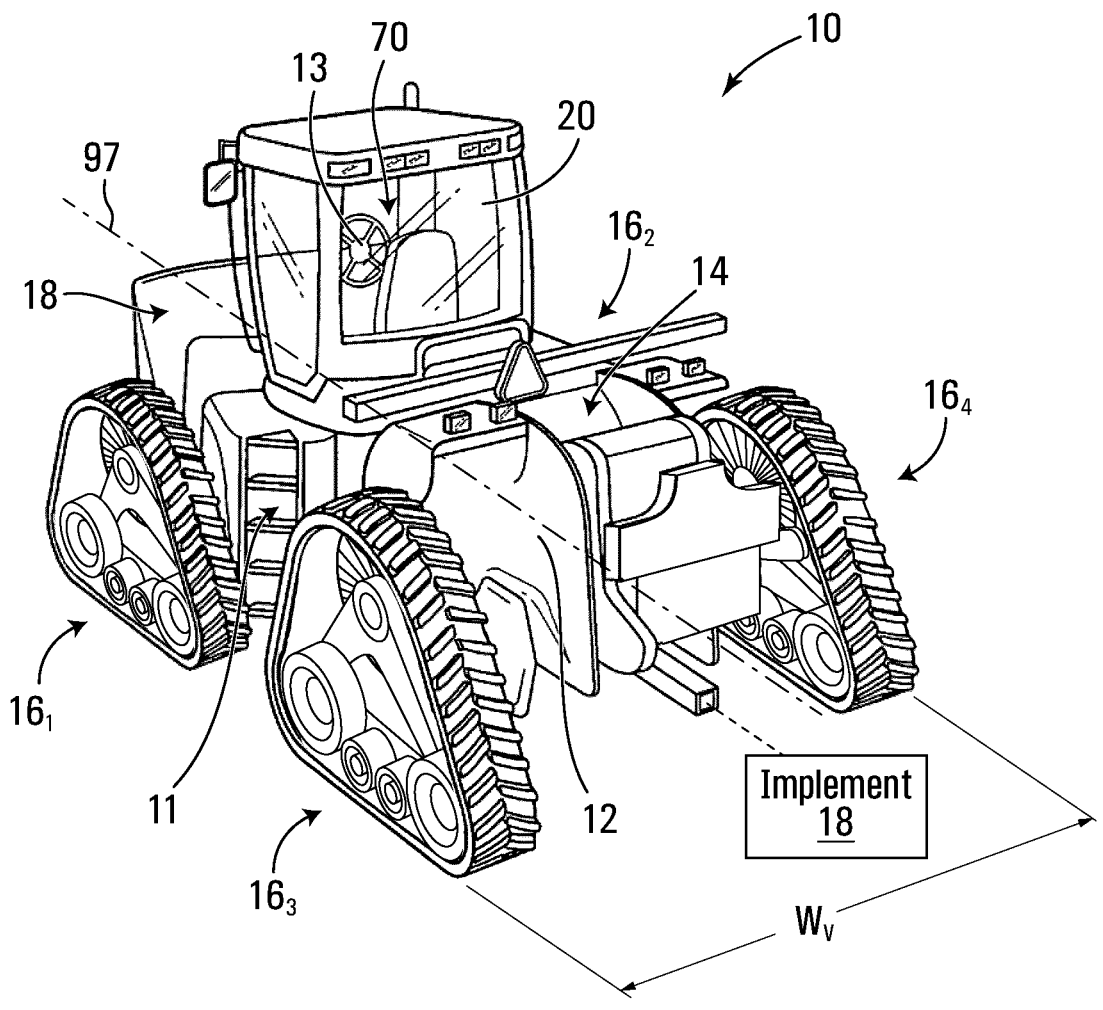
FIG. 1 shows an example of an agricultural vehicle comprising a track system in accordance with an embodiment.

FIG. 1 shows an example of an embodiment of a vehicle 10 comprising track systems $16_1$-$16_4$. In this embodiment, the vehicle 10 is a heavy-duty work vehicle for performing agricultural, construction or other industrial work, or military work. More particularly, in this embodiment, the vehicle 10 is an agricultural vehicle for performing agricultural work. Specifically, in this example, the agricultural vehicle 10 is a tractor. In other examples, the agricultural vehicle 10 may be a harvester, a planter, or any other type of agricultural vehicle.

As further discussed later, in this embodiment, wheels of the track systems $16_1$-$16_4$ may be designed to protect tracks of the track systems $16_1$-$16_4$ by reducing stresses that they induce in these tracks. For example, in this embodiment, circumferential surfaces of these wheels are uneven (i.e., non-straight such that each of them comprises one or more curved segments and/or one or more angled segments) in these wheels' widthwise direction. Also, in this embodiment, covering of these wheels are asymmetrical about their midpoint in their widthwise direction.

In this embodiment, the vehicle 10 comprises a frame 12, a powertrain 11, a steering mechanism 13, the track systems $16_1$-$16_4$ and an operator cabin 20 that enable a user to move the vehicle 10 on the ground, including on an agricultural field and possibly on a paved road (e.g., between agricultural fields), and perform work using a work implement 18.

The powertrain 15 is configured to generate power for the agricultural vehicle 10, including motive power for the track systems $16_1$-$16_4$ to propel the vehicle 10 on the ground. To that end, the powertrain 15 comprises a power source 14 (e.g., a primer mover) that includes one or more motors. For example, in this embodiment, the power source 14 comprises an internal combustion engine. In other embodiments, the power source 14 may comprise another type of motor (e.g., an electric motor) or a combination of different types of motor (e.g., an internal combustion engine and an electric motor). The powertrain 15 can transmit power from the power source 14 to one or more of the track systems $16_1$-$16_4$ in any suitable way (e.g., via a transmission, a differential, a direct connection, and/or any other suitable mechanism). In some embodiments, at least part of the powertrain 15 (e.g., a motor and/or a transmission) may be part of one or more of the track systems $16_1$-$16_4$.

The operator cabin 20 is where the user sits and controls the vehicle 10. More particularly, the operator cabin 20 comprises a user interface 70 allowing the user to steer the vehicle 10 on the ground, operate the work implement 18, and control other aspects of the vehicle 10. In this embodiment, the user interface 70 comprises input devices, such as an accelerator, a brake control, and a steering device (e.g., a steering wheel, a stick, etc.) that are operated by the user to control motion of the vehicle 10 on the ground. The user interface 70 also comprises output devices such as an instrument panel (e.g., a dashboard) which provides indicators (e.g., a speedometer indicator, a tachometer indicator, etc.) to convey information to the user.

The work implement 18 is used to perform agricultural work. For example, in some embodiments, the work implement 18 may include a combine head, a cutter, a scraper pan, a tool bar, a planter, or any other type of agricultural work implement.

The track systems $16_1$-$16_4$ engage the ground to provide traction to the vehicle 10. More particularly, in this embodiment, front ones of the track systems $16_1$-$16_4$ provide front traction to the vehicle 10, while rear ones of the track systems $16_1$-$16_4$ provide rear traction to the vehicle 10.

In this embodiment, each of the front ones of the track systems $16_1$-$16_4$ is pivotable relative to the frame 12 of the vehicle 10 about a steering axis 19 by the steering mechanism 13 (e.g., in response to input of the user at the steering device of the user interface 70) to change the orientation of that track system relative to the frame 12 in order to steer the vehicle 10 on the ground. The orientation of each of the front ones of the track systems $16_1$-$16_4$ relative to a longitudinal axis 97 of the vehicle 10, which defines a steering angle θ of that track system, is thus changeable. In this example, the steering mechanism 13 includes a steering unit (e.g., comprising a steering knuckle) on each side of the vehicle 10 dedicated to each of the front ones of the track systems $16_1$-$16_4$ and defining the steering axis 19 for that track system. Each of the front ones of the track systems $16_1$-$16_4$ is therefore steerable.

Figure 2:
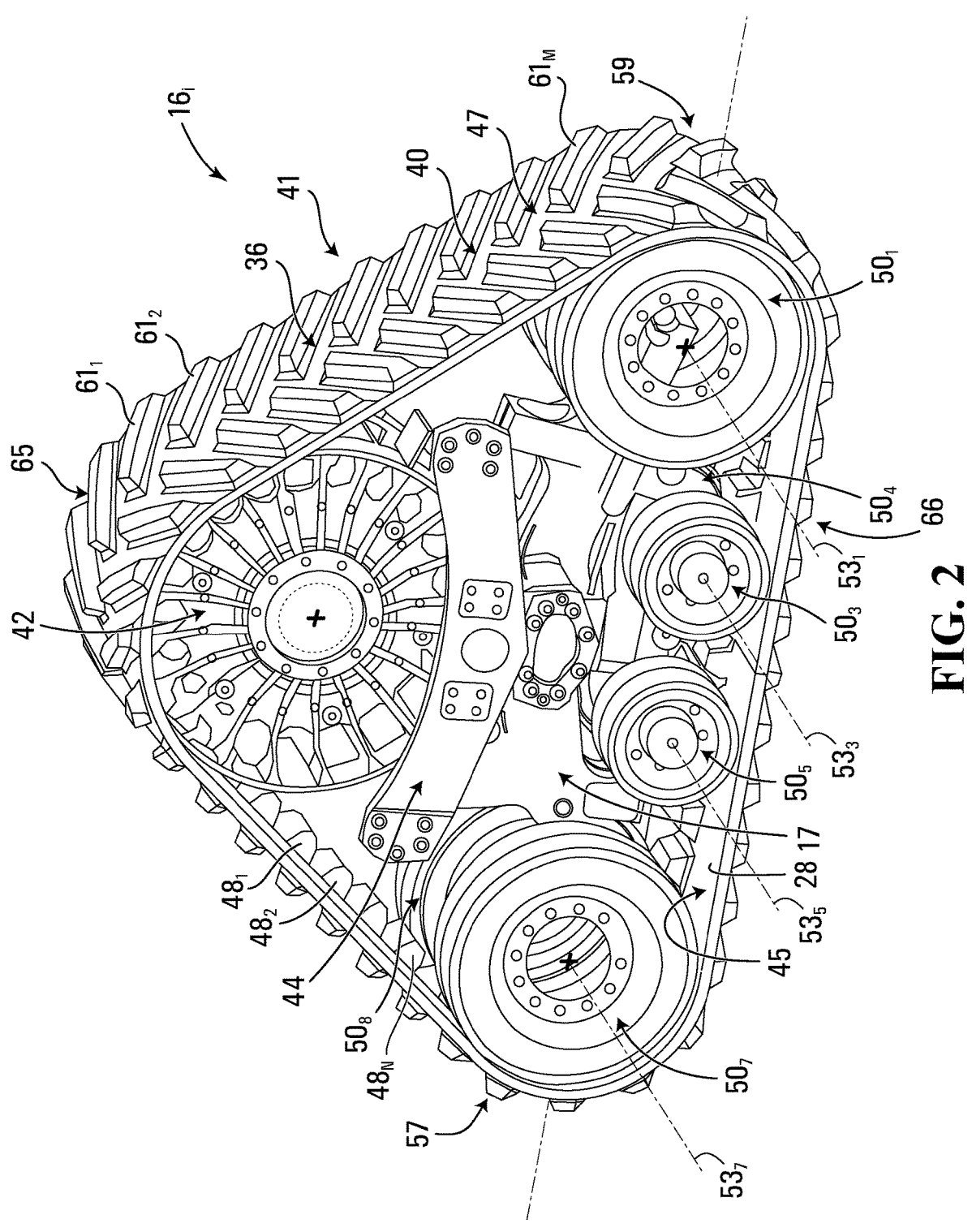
FIG. 2 shows a side view of the track system.
Figures 3, 4:
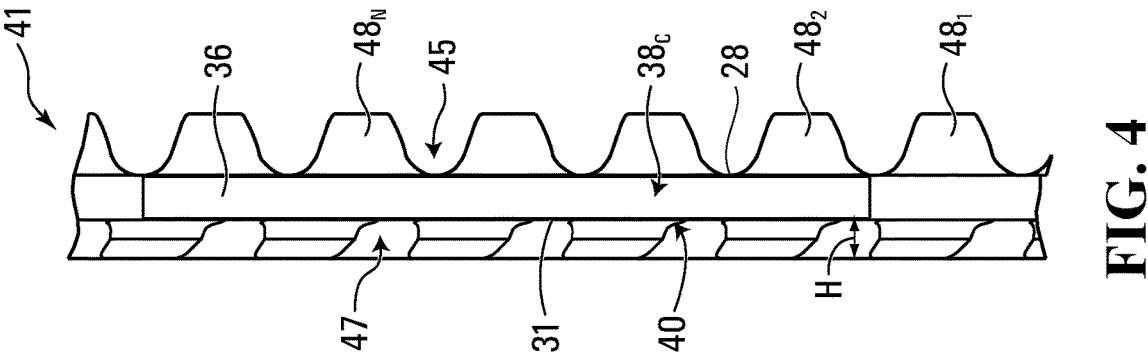
FIGS. 3 and 4 show a plan view and a side view of a track of the track system.
Figure 5:
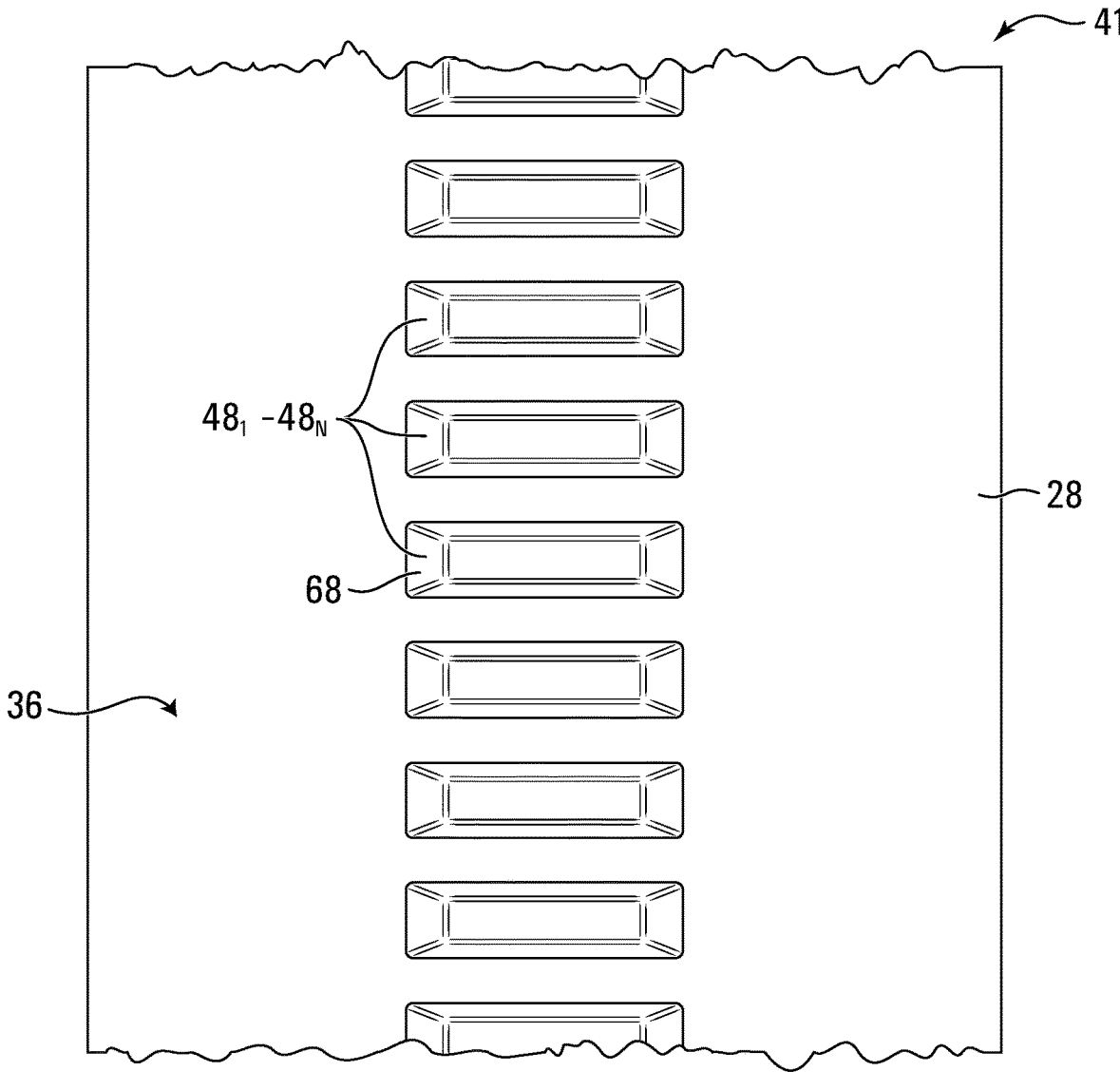
FIG. 5 shows an inside view of the track.
Figure 6:
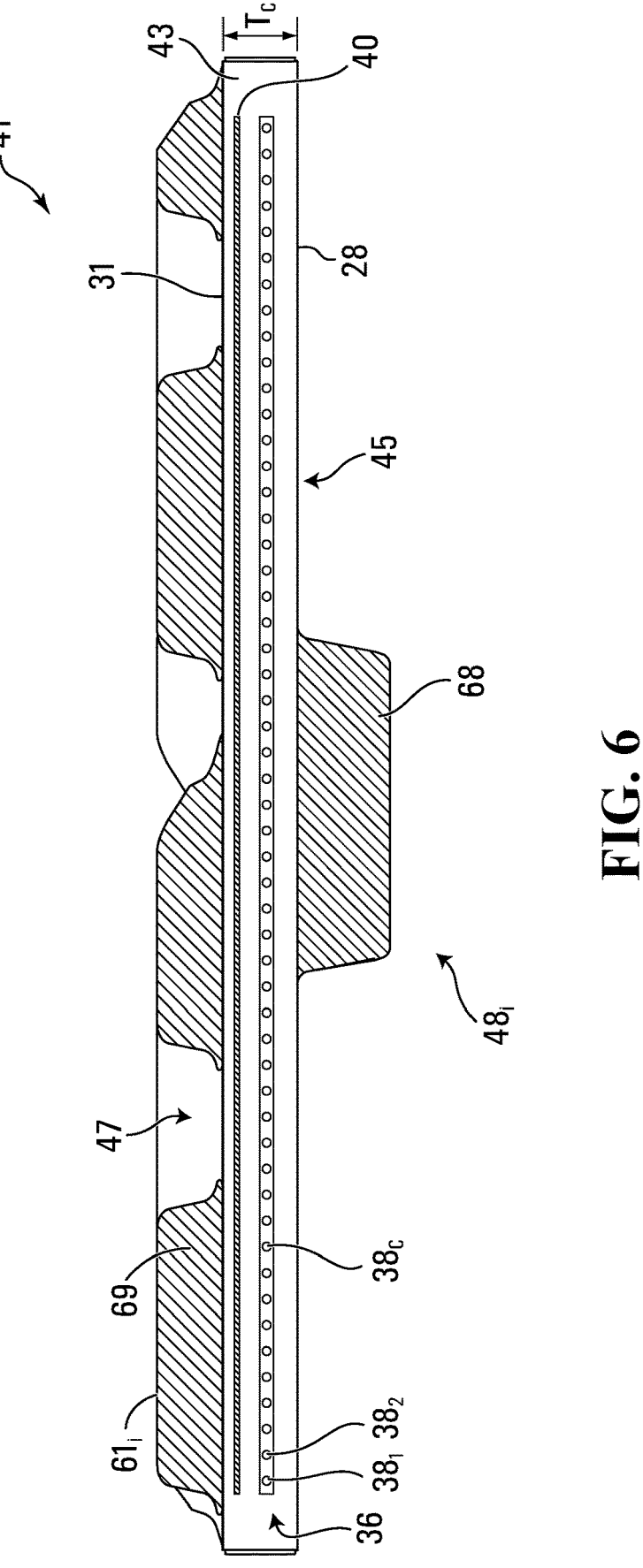
FIG. 6 shows a cross-sectional view of the track.

With additional reference to FIG. 2, in this embodiment, each track system $16_i$ comprises a track 41 and a track-engaging assembly 17 that is configured to drive and guide the track 41 around the track-engaging assembly 17. In this example, the track-engaging assembly 17 comprises a frame 44 and a plurality of track-engaging wheels which includes a drive wheel 42 and a plurality of track-contacting wheels $50_1$-$50_8$, which includes leading idler wheels $50_1$, $50_2$, trailing idler wheels $50_7$, $50_8$, and roller wheels $50_3$-$50_6$ between the leading idler wheels $50_1$, $50_2$ and the trailing idler wheels $50_7$, $50_8$. The wheels $50_1$-$50_8$ are rotatable about axis of rotations $53_1$-$53_8$. The track system $16_i$ has a front longitudinal end 57 and a rear longitudinal end 59 that define a length of the track system $16_i$. A width of the track system $16_i$ is defined by a width $W_T$ of the track 41. The track system $16_i$ has a longitudinal direction, a widthwise direction, and a heightwise direction.

The track 41 engages the ground to provide traction to the vehicle 10. A length of the track 41 allows the track 41 to be mounted around the track-engaging assembly 17. In view of its closed configuration without ends that allows it to be disposed and moved around the track-engaging assembly 17, the track 41 can be referred to as an "endless" track. Referring additionally to FIGS. 3 to 6, the track 41 comprises an inner side 45 facing the wheels 42, $50_1$-$50_8$ and defining an inner area of the track 41 in which these wheels are located. The track 41 also comprises a ground-engaging outer side 47 opposed to the inner side 45 for engaging the ground on which the vehicle 10 travels. Lateral edges $63_1$, $63_2$ of the track 41 define its width $W_T$. The track 41 has a top run 65 which extends between the longitudinal ends 57, 59 of the track system $16_i$ and over the track-engaging assembly 17, and a bottom run 66 which extends between the longitudinal ends 57, 59 of the track system $16_i$ and under the track-engaging assembly 17. The track 41 has a longitudinal direction, a widthwise direction, and a thicknesswise direction.

The track 41 is elastomeric, i.e., comprises elastomeric material, allowing it to flex around the wheels 42, $50_1$-$50_8$. The elastomeric material of the track 41 can include any polymeric material with suitable elasticity. In this embodiment, the elastomeric material includes rubber. Various rubber compounds may be used and, in some cases, different rubber compounds may be present in different areas of the track 41. In other embodiments, the elastomeric material of the track 41 may include another elastomer in addition to or instead of rubber (e.g., polyurethane elastomer). The track 41 can be molded into shape in a mold by a molding process during which its elastomeric material is cured.

More particularly, the track 41 comprises an elastomeric belt-shaped body 36 underlying its inner side 45 and its ground-engaging outer side 47. In view of its underlying nature, the body 36 can be referred to as a "carcass". The carcass 36 comprises elastomeric material 43 which allows the track 41 to flex around the wheels 42, $50_1$-$50_8$.

In this embodiment, the carcass 36 comprises a plurality of reinforcements embedded in its elastomeric material 43. One example of a reinforcement is a layer of reinforcing cables $38_1$-$38_C$ that are adjacent to one another and that extend in the longitudinal direction of the track 41 to enhance strength in tension of the track 41 along its longitudinal direction. In some cases, a reinforcing cable may be a cord or wire rope including a plurality of strands or wires. In other cases, a reinforcing cable may be another type of cable and may be made of any material suitably flexible longitudinally (e.g., fibers or wires of metal, plastic or composite material). Another example of a reinforcement is a layer of reinforcing fabric 40. Reinforcing fabric comprises pliable material made usually by weaving, felting, or knitting natural or synthetic fibers. For instance, a layer of reinforcing fabric may comprise a ply of reinforcing woven fibers (e.g., nylon fibers or other synthetic fibers). Various other types of reinforcements may be provided in the carcass 36 in other embodiments.

The carcass 36 may be molded into shape in the track's molding process during which its elastomeric material 43 is cured. For example, in this embodiment, layers of elastomeric material providing the elastomeric material 43 of the carcass 36, the reinforcing cables $38_1$-$38_C$ and the layer of reinforcing fabric 40 may be placed into the mold and consolidated during molding.

In this embodiment, the inner side 45 of the track 41 comprises an inner surface 28 of the carcass 36 and a plurality of wheel-contacting projections $48_1$-$48_N$ that project from the inner surface 28 to contact at least some of the wheels 42, $50_1$-$50_8$ and that are used to do at least one of driving (i.e., imparting motion to) the track 41 and guiding the track 41. In that sense, the wheel-contacting projections $48_1$-$48_N$ can be referred to as "drive/guide projections", meaning that each drive/guide projection is used to do at least one of driving the track 41 and guiding the track 41. Also, such drive/guide projections are sometimes referred to as "drive/guide lugs" and will thus be referred to as such herein. More particularly, in this embodiment, the drive/guide lugs $48_1$-$48_N$ interact with the drive wheel 42 in order to cause the track 41 to be driven, and also interact with the idler wheels $50_1$-$50_8$ in order to guide the track 41 as it is driven by the drive wheel 42. The drive/guide lugs $48_1$-$48_N$ are thus used to both drive the track 41 and guide the track 41 in this embodiment.

The drive/guide lugs $48_1$-$48_N$ are spaced apart along the longitudinal direction of the track 41. In this case, the drive/guide lugs $48_1$-$48_N$ are arranged in one row. The drive/guide lugs $48_1$-$48_N$ may be arranged in other manners in other embodiments (e.g., in two or more rows that are spaced apart along the widthwise direction of the track 41). Each of the drive/guide lugs $48_1$-$48_N$ is an elastomeric drive/guide lug in that it comprises elastomeric material 68. The drive/guide lugs $48_1$-$48_N$ can be provided and connected to the carcass 36 in the mold during the track's molding process.

The ground-engaging outer side 47 of the track 41 comprises a ground-engaging outer surface 31 of the carcass 36 and a plurality of traction projections $61_1$-$61_M$ that project from the outer surface 31 and engage and may penetrate into the ground to enhance traction. The traction projections $61_1$-$61_M$, which can sometimes be referred to as "traction lugs", are spaced apart in the longitudinal direction of the track system $16_i$. The ground-engaging outer side 47 comprises a plurality of traction-projection-free areas $71_1$-$71_F$ (i.e., areas free of traction projections) between successive ones of the traction projections $61_1$-$61_M$. In this example, each of the traction projections $61_1$-$61_M$ is an elastomeric traction projection in that it comprises elastomeric material 69. The traction projections $61_1$-$61_M$ can be provided and connected to the carcass 36 in the mold during the track's molding process.

The track 41 may be constructed in various other ways in other embodiments. For example, in some embodiments, the track 41 may comprise a plurality of parts (e.g., rubber sections) interconnected to one another in a closed configuration, the track 41 may have recesses or holes that interact with the drive wheel 42 in order to cause the track 41 to be driven (e.g., in which case the drive/guide lugs $48_1$-$48_N$ may be used only to guide the track 41 without being used to drive the track 41), and/or the ground-engaging outer side 47 of the track 41 may comprise various patterns of traction projections.

The drive wheel 42 is rotatable about an axis of rotation 49 for driving the track 41 in response to rotation of an axle of the vehicle 10. In this example, the axis of rotation 49 corresponds to the axle of the vehicle 10. More particularly, in this example, the drive wheel 42 has a hub which is mounted to the axle of the vehicle 10 such that power generated by the power source 14 and delivered over the powertrain 15 of the vehicle 10 rotates the axle, which rotates the drive wheel 42, which imparts motion of the track 41.

Figure 7:
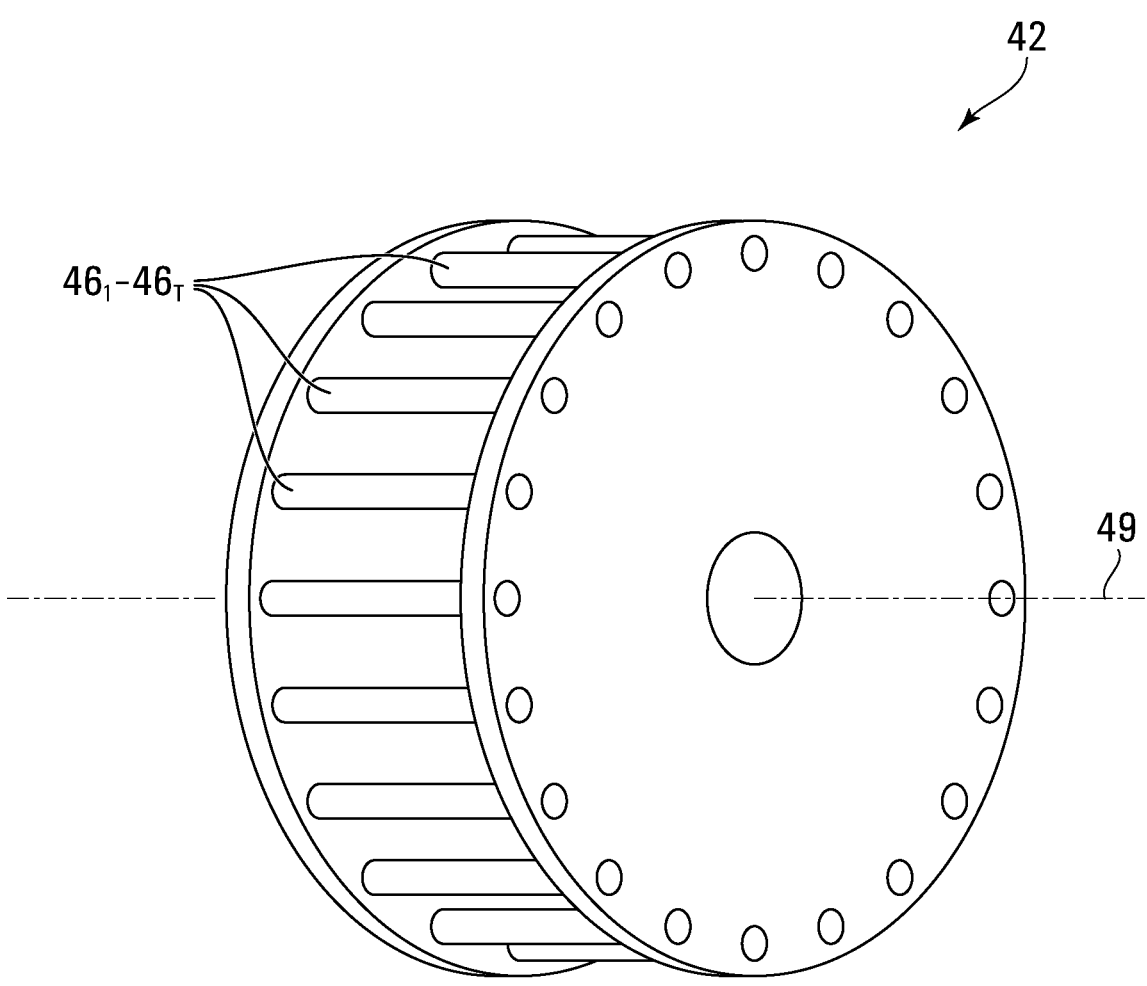
FIG. 7 shows a drive wheel of a track-engaging assembly of the track system.
Figure 8:
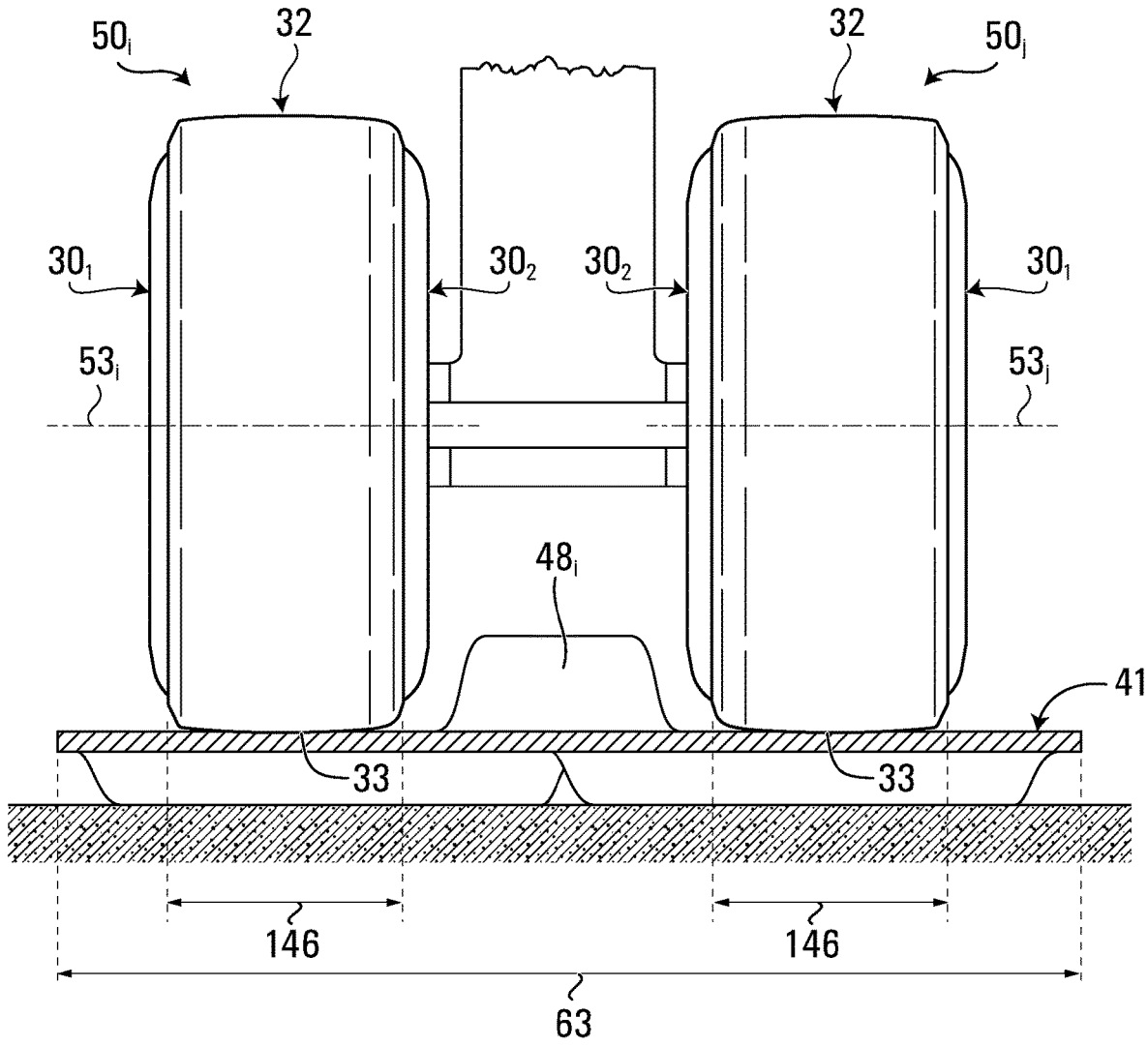
FIG. 8 shows mid-rollers of the track-engaging assembly engaging an inner side the track.
Figure 9:
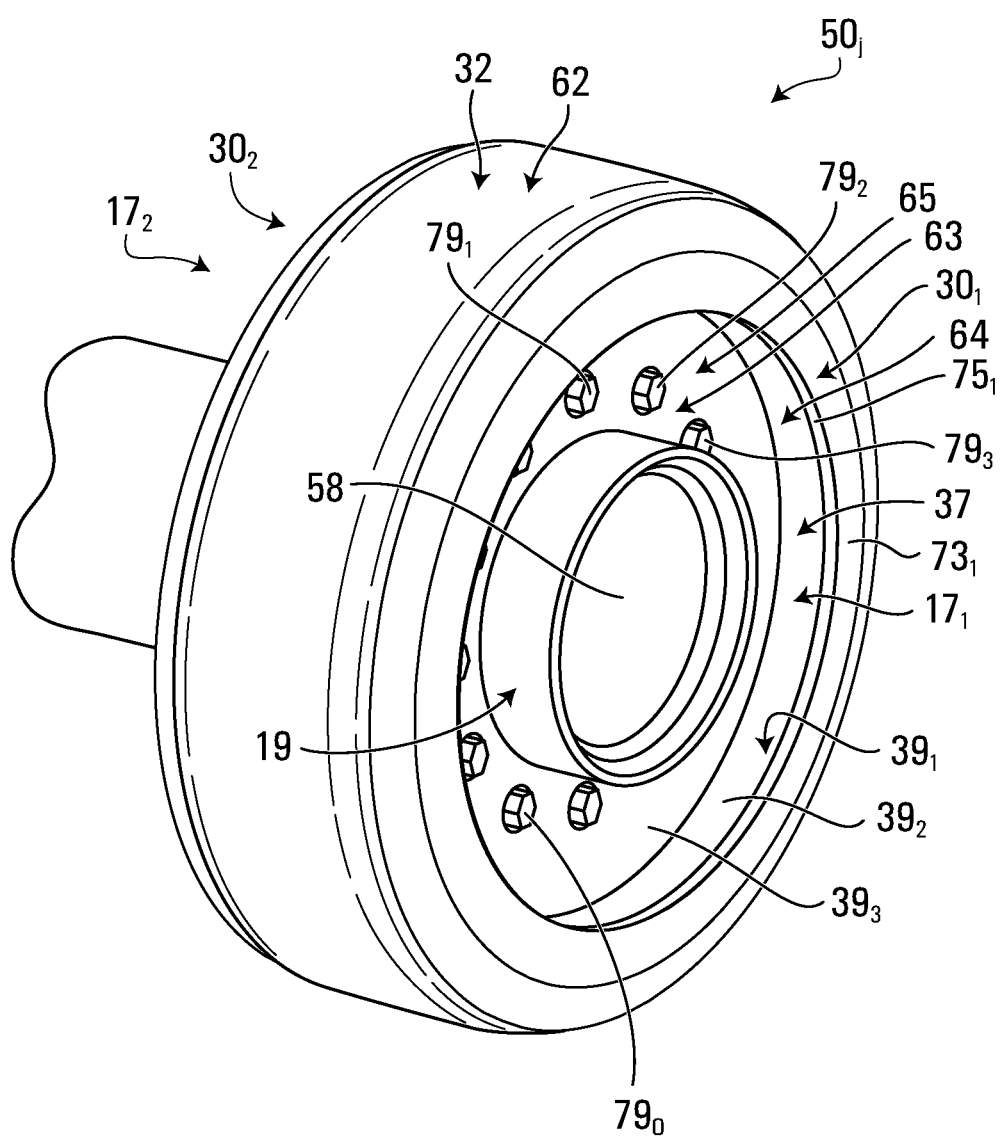
FIGS. 9 to 11 show perspective views and a cross-sectional view of a wheel, more particularly of a mid-roller, of the track-engaging assembly.
Figure 10:
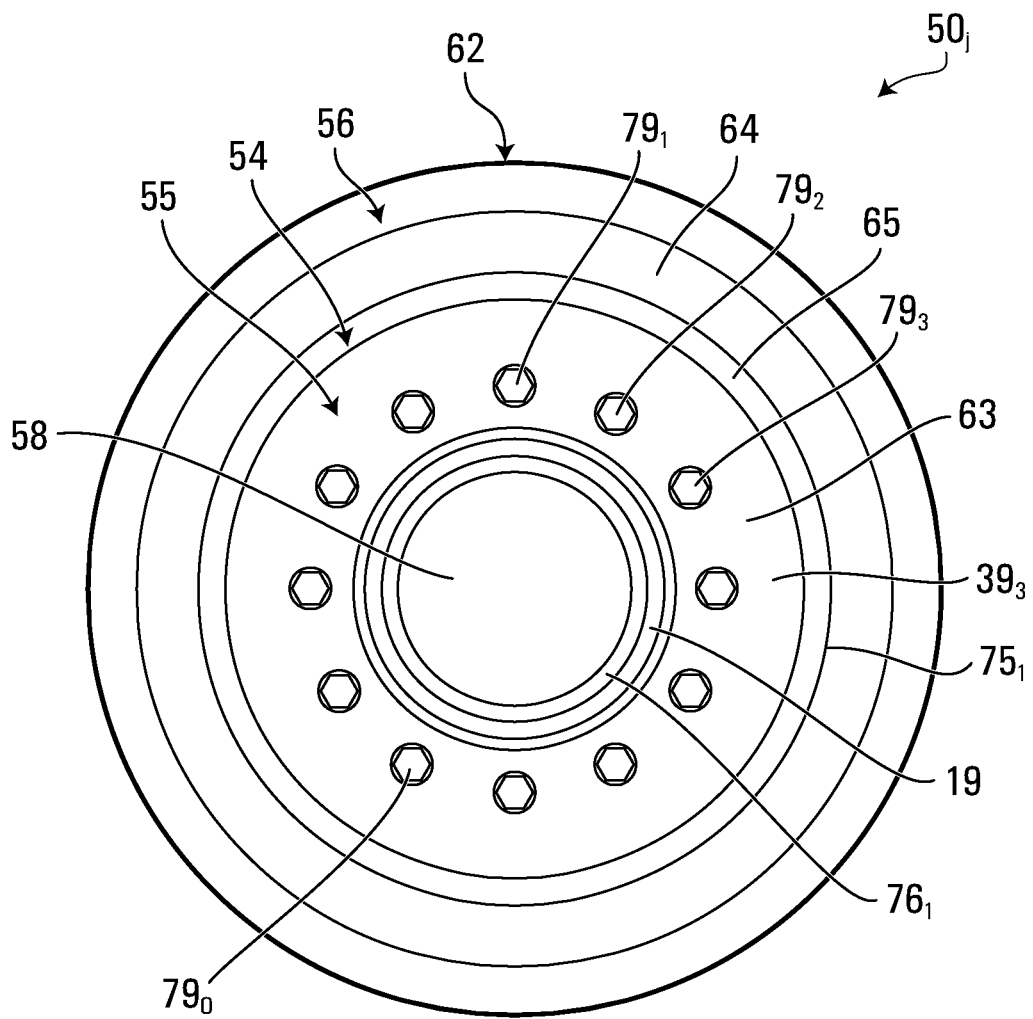
Figure 11:
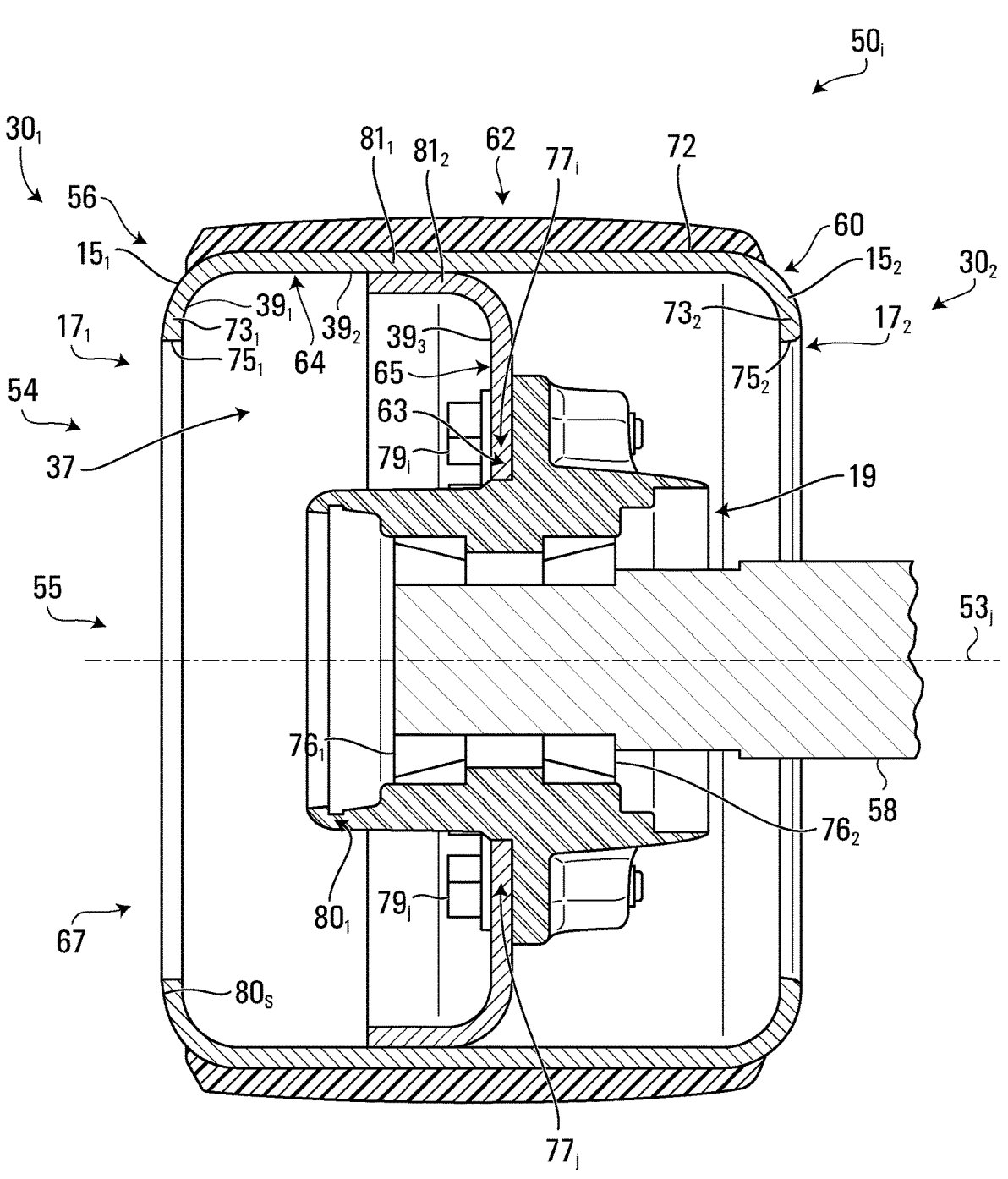
Figure 12:
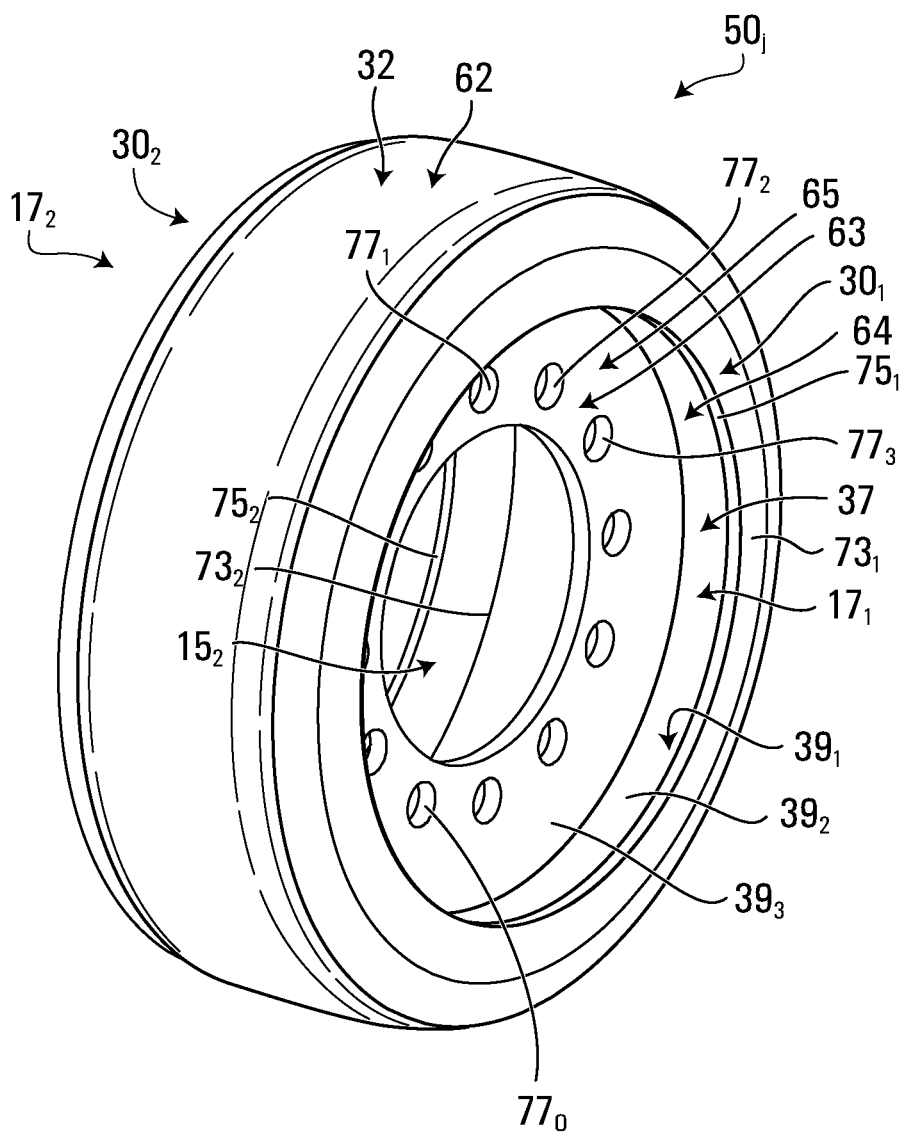
FIGS. 12 to 14 show a front view, a side view and a cross-sectional view of the mid-roller.
Figure 13:
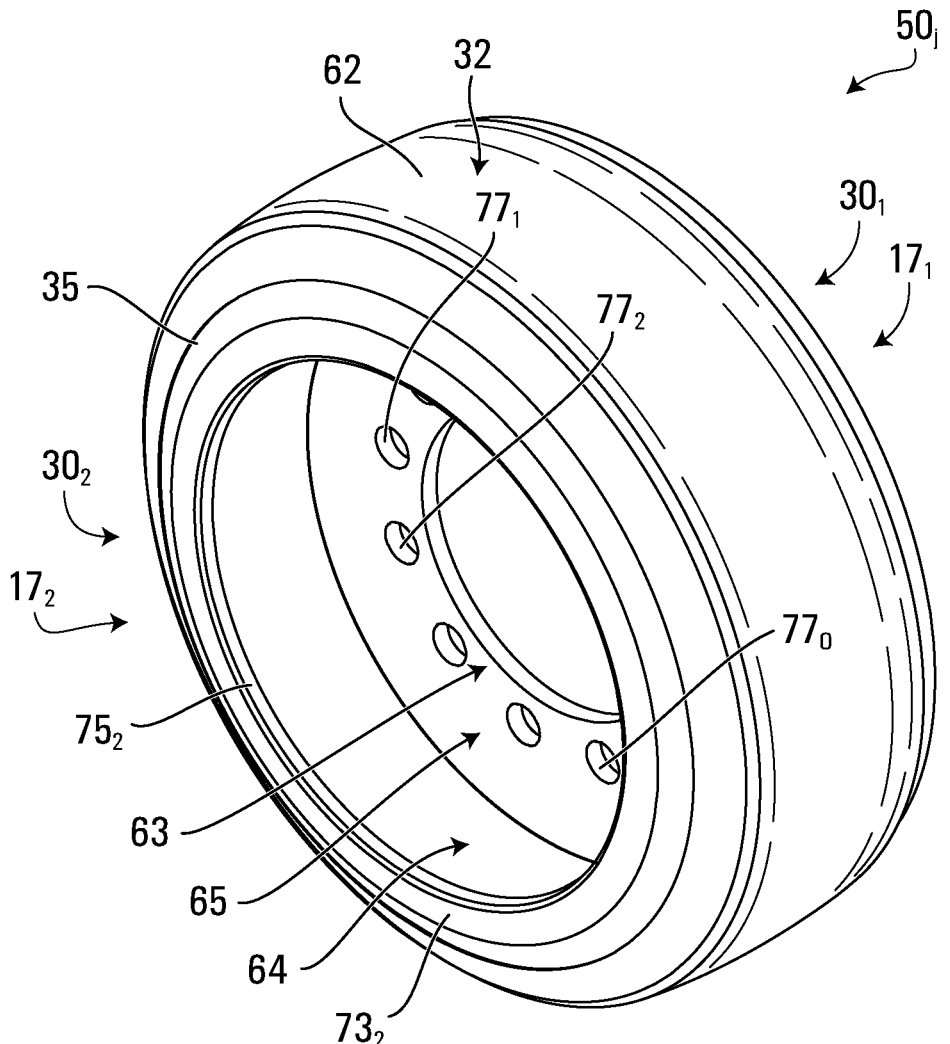
Figure 14:
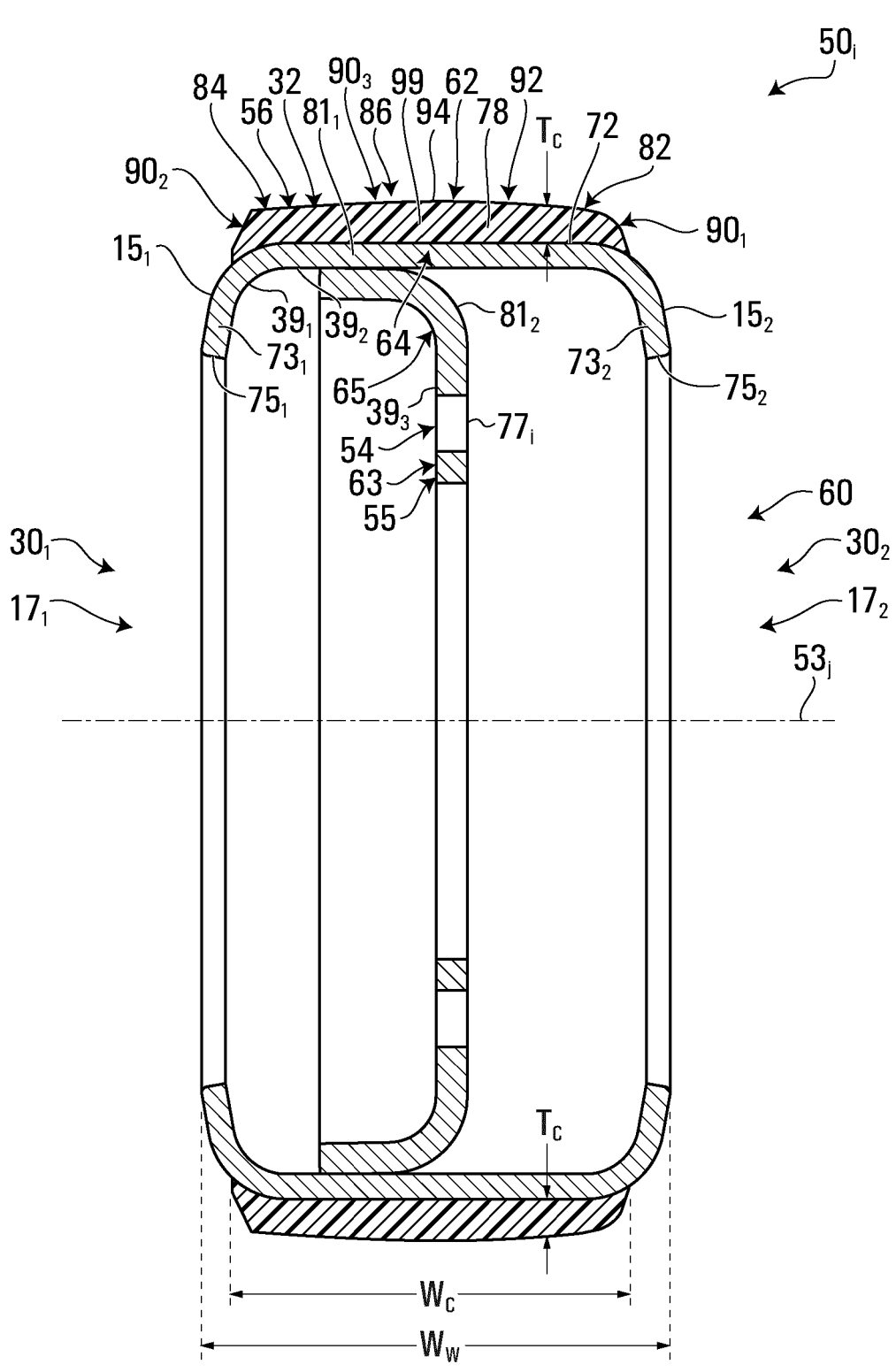

In this embodiment, as shown in FIG. 7, the drive wheel 42 comprises a drive sprocket engaging the drive/guide lugs $48_1$-$48_N$ of the inner side 45 of the track 41 in order to drive the track 41. In this case, the drive sprocket 42 comprises a plurality of drive members $46_1$-$46_T$ (e.g., bars, teeth, etc.) distributed circumferentially of the drive sprocket 42 to define a plurality of lug-receiving spaces therebetween that receive the drive/guide lugs $48_1$-$48_N$ of the track 41. The drive wheel 42 may be configured in various other ways in other embodiments. For example, in embodiments where the track 41 comprises recesses or holes, the drive wheel 42 may have teeth that enter these recesses or holes in order to drive the track 41. As yet another example, in some embodiments, the drive wheel 42 may frictionally engage the inner side 45 of the track 41 in order to frictionally drive the track 41.

The track-contacting wheels $50_1$-$50_8$ are not driven by power supplied by the powertrain 15, but are rather used to contact the bottom run of the track 66 of the track 41 and do at least one of supporting part of a weight of the vehicle 10 on the ground via the track 41, guiding the track 41 as it is driven by the drive wheel 42, and tensioning the track 41. More particularly, in this embodiment, the leading and trailing idler wheels $50_1$, $50_2$, $50_7$, $50_8$ maintain the track 41 in tension, and can help to support part of the weight of the vehicle 10 on the ground via the track 41. The roller wheels $50_3$-$50_6$ roll on the inner side 45 of the track 41 along the bottom run 66 of the track 41 to apply the bottom run 66 on the ground. As they are located between the leading and trailing idler wheels $50_1$, $50_2$, $50_7$, $50_8$, the roller wheels $50_3$-$50_6$ may be referred to as "mid-rollers". The track-contacting wheels $50_1$-$50_8$ may be arranged in other configurations and/or the track system $16_i$ may comprise more or less of them in other embodiments.

The frame 44 of the track system $16_i$ supports components of the track system $16_i$, including the track-contacting wheels $50_1$-$50_8$. More particularly, in this embodiment, the front idler wheels $50_1$, $50_2$ are mounted to the frame 44 in a front longitudinal end region of the frame 44 proximate the front longitudinal end 57 of the track system $16_i$, while the rear idler wheels $50_7$, $50_8$ are mounted to the frame 44 in a rear longitudinal end region of the frame 44 proximate the rear longitudinal end 59 of the track system $16_i$. The mid-rollers $50_3$-$50_6$ are mounted to the frame 44 in a central region of the frame 44 between the front idler wheels $50_1$, $50_2$ and the rear idler wheels $50_7$, $50_8$. Each of the mid-rollers $50_3$-$50_6$ may be rotatably mounted directly to the frame 44 or may be rotatably mounted to a link which is pivotally mounted to the frame 44 to which is rotatably mounted an adjacent one of the mid-rollers $50_3$-$50_6$ (e.g., forming a "tandem").

The frame 44 of the track system $16_i$ is supported at a support area 39. More specifically, in this embodiment, the frame 44 is supported by the axle of the vehicle 10 to which is coupled the drive wheel 42, such that the support area 39 is intersected by the axis of rotation 49 of the drive wheel 42.

Figure 25:
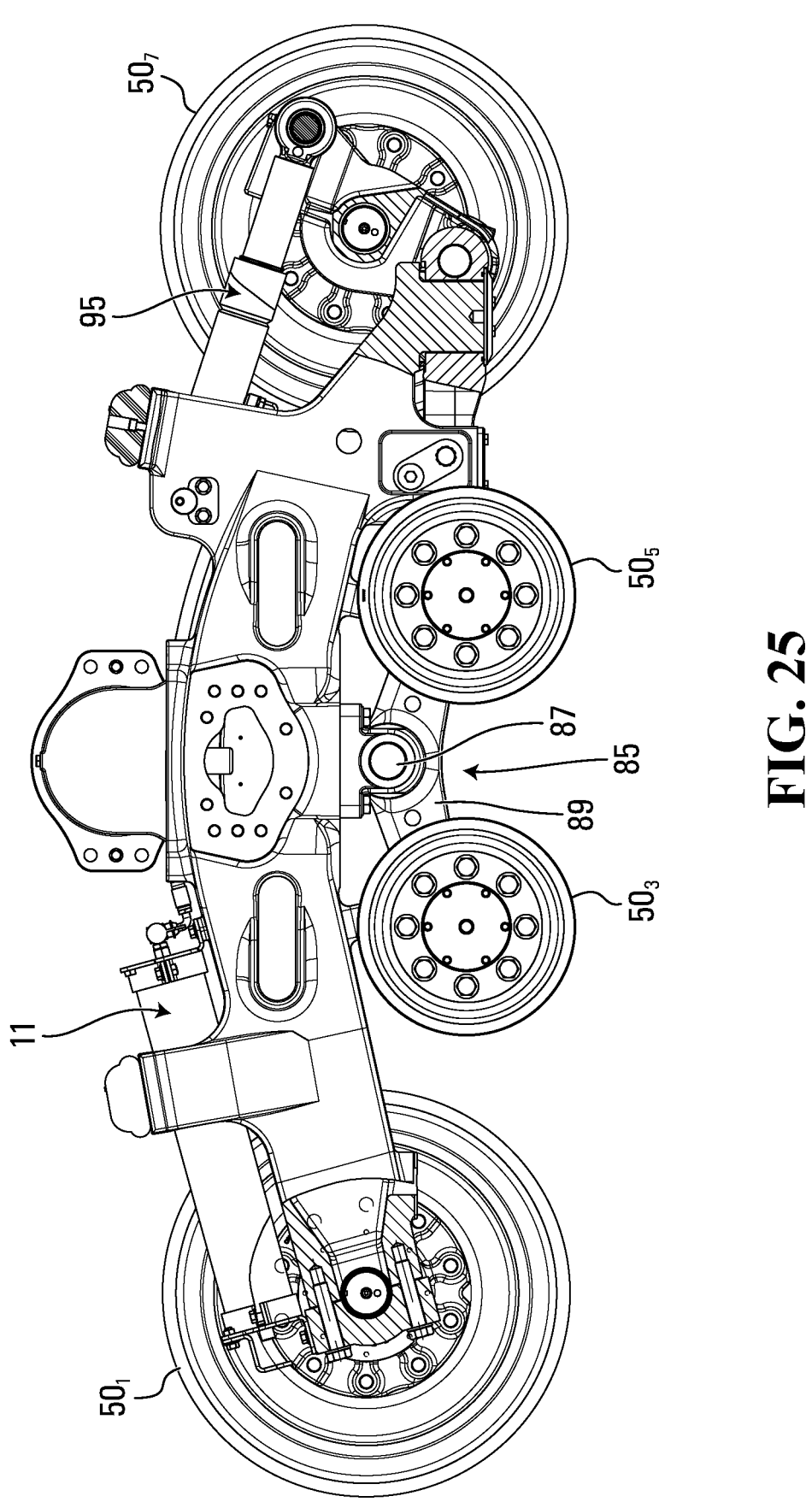
FIG. 25 shows a partial cross-sectional side view of a lower portion of the track system, including a bogie for mounting the mid-rollers.
Figure 26:
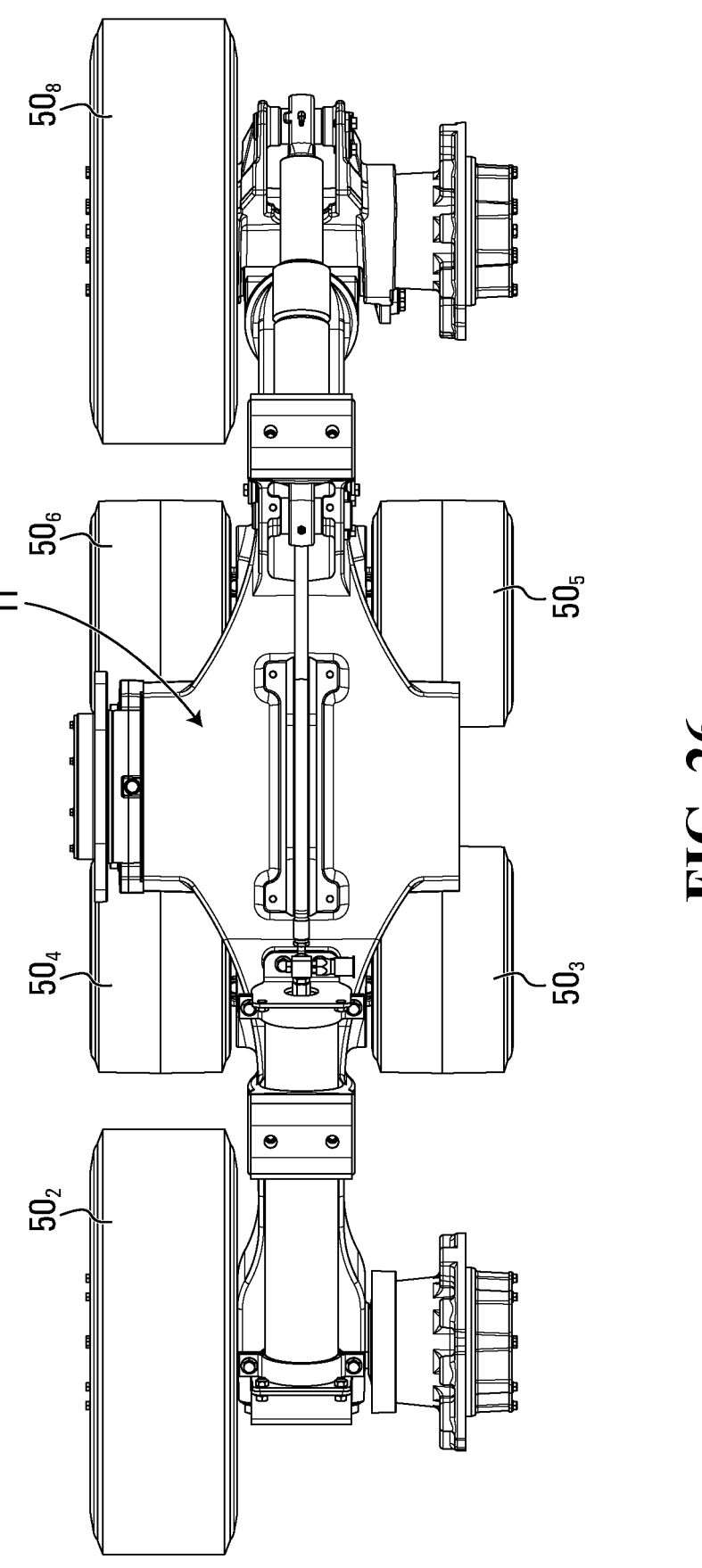
FIG. 26 shows a top view of the lower portion of the track system with two idler wheels being omitted to show a hub of the idler wheels.

In addition, in this embodiment, as shown in FIGS. 25 and 26, the track system $16_i$ comprises a wheel-mounting sub-assembly 85 which may be referred to as a "bogie". The bogie 85 is configured to carry the mid-rollers $50_3$-$50_6$ and is mounted to the frame 44 of the track system $16_i$. More specifically, the bogie 85 comprises a link 89 to which are mounted the mid-rollers $50_3$-$50_6$. The bogie 85 is pivotable relative to the frame 44 of the track system $16_i$ about a pivot 87 defining an axis of rotation 88 that is perpendicular to the longitudinal axis 61 of the track system $16_i$. The bogie 85 thus imparts the mid-rollers $50_3$-$50_6$ with a pivoting motion capability which may be referred to as a "pitch" motion. The mid-rollers $50_3$-$50_6$ may not be mounted to a bogie in other embodiments. For example, the mid-rollers $50_3$-$50_6$ may be mounted directly to the frame 44 of the track system $16_i$ in other embodiments.

Moreover, as shown in FIG. 25, the track system $16_i$ may comprise a tensioning mechanism 95 for tensioning the track 41. For instance, in this embodiment, the tensioning mechanism 95 comprises an actuator mounted at one end to the frame 44 of the track system $16_i$ and at another end to a hub of the front idler wheels $50_1$, $50_2$. This allows the tensioning mechanism 95 to modify a distance between the front idler wheels $50_1$, $50_2$ and the rear idler wheels $50_7$, $50_8$ in the longitudinal direction of the track system $16_i$.

In this embodiment, respective ones of the track-contacting wheels $50_1$-$50_8$, notably the mid-rollers $50_3$-$50_6$, are configured to protect the track 41 by reducing stresses that they induce in the track 41.

With additional reference to FIGS. 8 to 14, each mid-roller $50_i$ comprises lateral sides $30_1$, $30_2$ opposite one another and defining an inboard side and an outboard side, and a circumferential surface 32 disposed between the sides $30_1$, $30_2$ and configured to roll on the inner side 45 of the track 41. The mid-roller $50_i$ has an axis of rotation 74, a widthwise direction defining a width $W_w$ of the mid-roller $50_i$, a radial direction, and a circumferential direction. More particularly, in this embodiment, the inner side 45 of the track 41 comprises a rolling path 33 on which the mid-roller $50_i$ rolls. The rolling path 33 is delimited by some of the drive/guide lugs $48_1$-$48_N$ such that, as the mid-roller $50_i$ rolls, these drive/guide lugs pass next to the mid-roller $50_i$.

The mid-roller $50_i$ comprises a circumferential portion 56, a hub portion 55, and a radially-extending portion 54 between the circumferential portion 56 and the hub portion 55. The hub portion 55 is an inner portion of the mid-roller $50_i$ which is associated with a hub 19 receiving an axle 58 for the mid-roller $50_i$. For instance, this may be done by fitting or press-fitting the axle 58 into bearings $76_1$, $76_2$, the bearings $76_1$, $76_2$ being fit or press-fit into an internal cavity of the hub 19, or by any suitable means. The circumferential portion 56 is an outer portion of the mid-roller $50_i$ which rolls on the rolling path 33 of the inner side 45 of the track 41. The radially-extending portion 34 is an intermediate portion of the mid-roller $50_i$ which extends radially between the hub portion 55 and the circumferential portion 56.

In this example, the mid-roller $50_i$ may contact a drive/guide lug $48_i$ of the track 41 adjacent to it during motion of the track 41. More particularly, in this embodiment, the lateral side $30_2$ of the mid-roller $50_i$, which faces the drive/guide lug $48_i$, comprises a projection-contacting part 35 that can contact the drive/guide lug $48_i$ when the mid-roller $50_i$ contacts the drive/guide lug $48_i$ as the drive/guide lug $48_i$ passes next to the mid-roller $50_i$. The projection-contacting part 35, which will be referred to as a "lug-contacting part", has a shape that depends on respective shapes of the mid-roller $50_i$ and the drive/guide lug $48_i$, but generally has a radial dimension C in a direction parallel to a radius R of the mid-roller $50_i$ no greater than a height H of the drive/guide lug $48_i$.

The mid-roller $50_i$ may be configured to reduce stress induced in the track 41. To that end, in this embodiment, the circumferential surface 32 of the mid-roller $50_i$ is uneven (i.e., non-straight such that it comprises one or more curved segments and/or one or more angled segments) in the widthwise direction of the mid-roller $50_i$.

In this embodiment, the circumferential surface 32 of the mid-roller $50_i$ comprises a lateral track-contacting portion 82 adjacent to the lateral side $30_1$ of the mid-roller $50_i$, a lateral track-contacting portion 84 adjacent to the lateral side $30_2$ of the mid-roller $50_i$, and an intermediate track-contacting portion 86 between the lateral track-contacting portions 82, 84 of the circumferential surface 32 in the widthwise direction of the mid-roller $50_i$ and extending farther from the axis of rotation 74 of the mid-roller $50_i$ than the lateral track-contacting portions 82, 84 of the circumferential surface 32 in the radial direction of the mid-roller $50_i$.

The circumferential surface 32 may have any suitable dimensions and may occupy a significant part of the width of the track 41. For example, in some embodiments, a ratio of the width of the circumferential surface 32 over the width of the mid-roller $50_i$ may be at least 50%, in some embodiments at least 55%, in some embodiments at least 60%, in some embodiments at least 65%, in some embodiments at least 70%, in some embodiments at least 75%, in some embodiments at least 80%, in some embodiments at least 85%, in some embodiments at least 90%, in some embodiments at least 95%, in some embodiments even more (e.g. 99%, 100%), while in some embodiments the ratio of the width of the circumferential surface 32 over the width of the mid-roller $50_i$ may be less than 95%, in some embodiments less than 85%, in some embodiments less than 75%, in some embodiments less than 65%, in some embodiments less than 60% and in some embodiments even less (e.g. less than 55%). In a similar fashion, in some embodiments, the circumferential surface 32 may occupy a majority of a width of the rolling path 33 of the track 41, in some embodiments two thirds of the width of the rolling path 33, in some embodiments three quarters of the width of the rolling path 33 and in some embodiments even more (e.g., seven eights of the rolling path 33, an entirety of the rolling path 33, etc.).

More particularly, in this embodiment, the circumferential surface 32 of the mid-roller $50_i$ is curved in the widthwise direction of the mid-roller $50_i$, so as to define its track-contacting portions 82, 84, 86. That is, at least part (i.e., some but less than all, or all) of the circumferential surface 32 of the mid-roller $50_i$ is curved in the widthwise direction of the mid-roller $50_i$ such that the circumferential surface 32 comprises a crown 92. A radius of curvature of the circumferential surface 32 of the mid-roller $50_i$ in the widthwise direction of the mid-roller $50_i$ may help to reduce stress towards the track-contacting portions 82, 84 of the circumferential surface 32, where stress concentrations typically appear in the mid-roller $50_i$, thereby also reducing the stress generated in the track 41 beneath the mid-roller $50_i$.

In this embodiment, the radius of curvature of the circumferential surface 32 of the mid-roller $50_i$ in the widthwise direction of the mid-roller $50_i$ is substantially constant (i.e. remains substantially the same over a substantial portion of the circumferential surface 32). In particular, in this embodiment, the circumferential surface 32 defines and comprises the crown 92 of the mid-roller $50_i$. For example, in some embodiments, a ratio of the radius of curvature of the circumferential surface 32 over a width of the mid-roller $50_i$ may be at least 3, in some embodiments at least 4, in some embodiments at least 5, in some embodiments at least 6, in some embodiments at least 8 and in some embodiments at least 10 and in some embodiments at least 12. As another example, in some embodiments, the radius of curvature of the circumferential surface 32 and the crown 92 may be at least 500 mm, in some embodiments at least 600 mm, in some embodiments at least 700 mm, in some embodiments at least 800 mm, in some embodiments at least 900 mm and in some embodiments at least 1000 mm. As another example, the radius of curvature of the circumferential surface 32 may be greater than a radius of the mid-roller $50_i$ and in some embodiments a ratio of the radius of curvature of the circumferential surface 32 over the radius of the mid-roller $50_i$ may be at least 3, in some embodiments at least 4, in some embodiments at least 5, in some embodiments at least 6 and in some embodiments even more.

In other embodiments, the geometry (i.e. shape) of the intermediate portion 86 of the circumferential surface 32 may be different from the geometry of the lateral portions 82, 84. For example, the radius of curvature of the circumferential surface 32 of the mid-roller $50_i$ in the widthwise direction of the mid-roller $50_i$ may vary such that the radius of curvature of the circumferential surface 32 at the lateral portions 82, 84 is smaller than the radius of curvature of the circumferential surface 32 at the intermediate portion 86. For instance, in some embodiments, a radius of curvature of the intermediate track-contacting portion 86 of the circumferential surface 32 in the widthwise direction of the mid-roller $50_i$ may be at least 500 mm, in some embodiments at least 600 mm, in some embodiments at least 700 mm, in some embodiments at least 800 mm, in some embodiments at least 900 mm and in some embodiments at least 1000 mm, while a radius of curvature of the lateral portions 82, 84 of the circumferential surface 32 in the widthwise direction of the mid-roller $50_i$ may be no more than 100 mm, in some embodiments no more than 70 mm, in some embodiments no more than 50 mm, in some embodiments no more than 30 mm, in some embodiments no more than 20 mm, in some embodiments even less. As another example, in some embodiments, the lateral portion 82 may be rounded such that it has more than one radii of curvature or such that it has a variable radius of curvature, the radii of curvature or variable radius of curvature ranging between 2 mm and 100 mm, in some embodiments between 6 mm and 75 mm and in some embodiments between 12 mm and 50 mm.

In this embodiment, the crown 92 is generally centered in the widthwise direction of the mid-roller $50_i$. That is, an apex 94 of the crown 92 may be located in a central portion of the mid-roller $50_i$, such as in the intermediate portion 86 of the circumferential surface 32 of the mid-roller $50_i$. For example, in some embodiments, the apex 94 of the crown 92 may be located in a central third of the mid-roller $50_i$, in some embodiments in the central fifth of the mid-roller $50_i$, in some embodiments in the central seventh of the mid-roller $50_i$ and in some embodiments at a midpoint 99 of the mid-roller $50_i$ in the widthwise direction of the wheel.

Also, in this embodiment, the circumferential surface 32 of the mid-roller $50_i$ is asymmetrical about the midpoint 99 of the mid-roller $50_i$ in the widthwise direction of the mid-roller $50_i$. That is, left and right halves of the circumferential surface 32 in the widthwise direction of the mid-roller $50_i$ may be shaped differently.

The arrangement of the lateral and intermediate portions 82, 84, 86 of the circumferential surface 32 with different portions 82, 84 may configure the mid-roller $50_i$ to generate more or less stress on different portions of the track 41. In particular, a maximum stress on a track towards a side of a mid-roller facing the drive/guide lug is typically greater than a maximum stress on the track towards an opposite side of the mid-roller facing an edge of the track. In this embodiment, the mid-roller $50_i$ may be configured to generate less stress on the track 41 at the lateral side $30_2$ of the mid-roller $50_i$ relative to stress generated on the track 41 by the mid-roller $50_i$ at the lateral side $30_1$ of the mid-roller $50_i$. For example, the mid-roller $50_i$ may be configured such that a ratio of a maximum stress on the track 41 towards the lateral side $30_2$ over a maximum stress on the track 41 towards the lateral side $30_1$ is no more than 2, in some embodiments no more than 1.75, in some embodiments no more than 1.5, embodiments no more than 1.25, embodiments no more than 1 and in some embodiments even less than 1 (i.e. the maximum stress generated on the track 41 by the mid-roller $50_i$ at the lateral side $30_2$ of the mid-roller $50_i$ may be less than the maximum stress generated on the track 41 by the mid-roller $50_i$ at the lateral side $30_1$ of the mid-roller $50_i$).

Figure 15A:
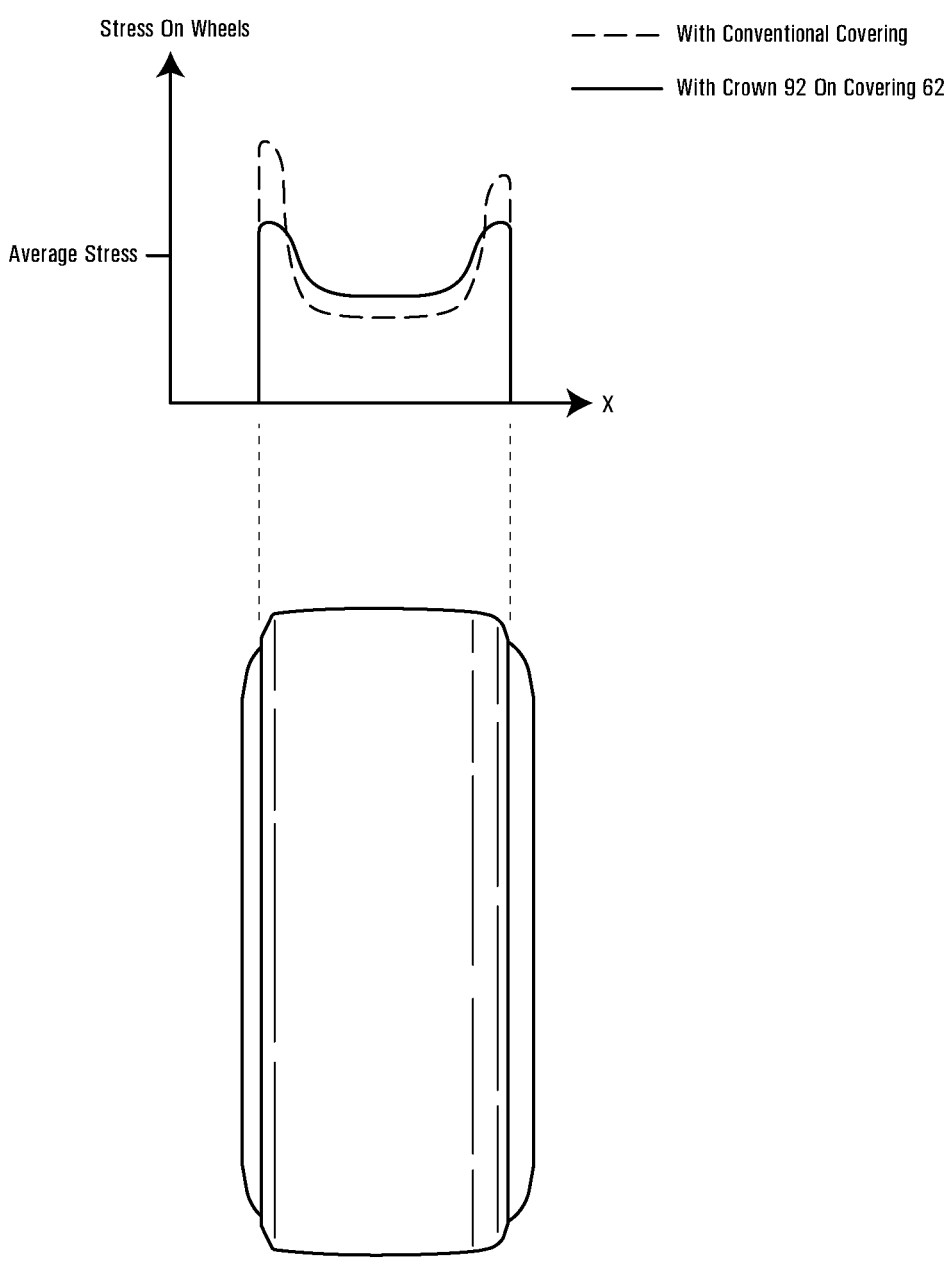
FIG. 15A shows local stresses on a circumferential surface of the mid-roller.
Figure 15B:
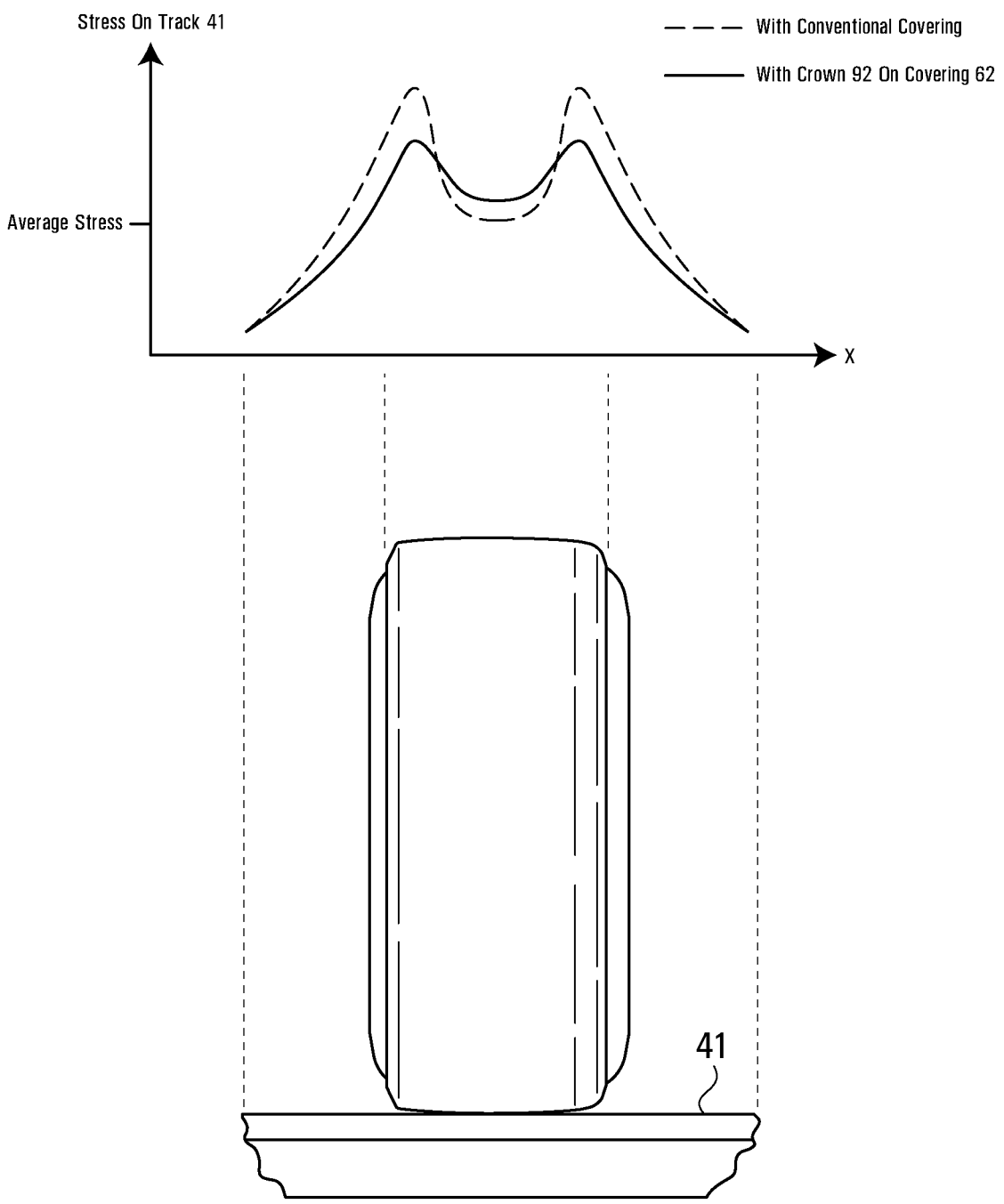
FIG. 15B shows local stresses applied by the mid-roller on the track.

As previously discussed, the arrangement of the lateral and intermediate portions 82, 84, 86 of the circumferential surface 32 may configure the mid-roller $50_i$ to generate less stress on the track 41 by reducing stress concentration of the stress transmitted by the mid-roller $50_i$ on the track 41, as shown in FIG. 15B. That is, the mid-roller $50_i$ may be configured to generate lower maximum stresses on the track 41. For instance, in some embodiments, a ratio of the maximum stresses generated on the track 41 over average stress on the track 41 may be no more than 1.4, in some embodiments no more than 1.3, in some embodiments no more than 1.2, and in some embodiments even less (e.g., 1.1).

In a similar manner, the arrangement of the portions 82, 84, 86 may configure the mid-roller $50_i$ to generate less stress at the circumferential portion 56 of the mid-roller $50_i$ by reducing stress concentration at the circumferential surface 32, as shown in FIG. 15A. That is, the mid-roller $50_i$ may be configured to generate lower maximum local stresses at the circumferential surface 32. For instance, in some embodiments, a ratio of the maximum local stresses generated on the circumferential surface 32 over average stress on the circumferential surface 32 may be no more than 1.5, in some embodiments no more than 1.4, in some embodiments no more than 1.3, and in some embodiments even less (e.g., 1.2).

More particularly, in this embodiment, the mid-roller $50_i$ comprises a body 60 and a covering 62 on the body 60 to improve performance of the mid-roller $50_i$, such as by improving contact between the mid-roller $50_i$ and the inner side 45 of the track 41, enhancing an abrasion resistance of the mid-roller $50_i$, and/or by absorbing vibrations.

The body 60 of the mid-roller $50_i$ is a core of the mid-roller $50_i$ that imparts structural integrity to the mid-roller $50_i$. The body 60 of the mid-roller $50_i$ has lateral sides $17_1$, $17_2$ opposite one another and a circumferential surface 72 between the lateral sides $17_1$, $17_2$. In this case, the lateral sides $17_1$, $17_2$ of the body 60 of the mid-roller $50_i$ constitute parts of the sides $30_1$, $30_2$ of the mid-roller $50_i$, while the circumferential surface 72 of the body 60 of the mid-roller $50_i$ is covered by the covering 62. The body 60 of the mid-roller $50_i$ comprises a rim portion 64, a hub portion 63, and a radially-extending portion 65 between the rim portion 64 and the hub portion 63.

With additional reference to FIGS. 9 to 14, the hub portion 63 of the body 60 of the mid-roller $50_i$ constitutes the hub portion 55 of the mid-roller $50_i$. The hub portion 63 of the body 60 of the mid-roller $50_i$ is thus associated with the hub 19. In this case, the hub 19 is removably mounted to the body 60 of the mid-roller $50_i$. More particularly, in this case, the hub portion 63 of the body 60 of the mid-roller $50_i$ comprises a plurality of openings $77_1$-$77_O$ to receive a plurality of fasteners $79_1$-$79_O$ that interconnect the body 60 of the mid-roller $50_i$ to the hub 19. The hub portion 63 may be configured in various other ways in other embodiments (e.g., the hub 19 may be integrally formed (e.g., cast) with or permanently affixed (e.g., welded) to the hub portion 63 of the body 60 of the mid-roller $50_i$).

The rim portion 64 of the body 60 of the mid-roller $50_i$ is part of the rim portion 56 of the mid-roller $50_i$. The rim portion 64 comprises the circumferential surface 72 and outer parts of the lateral sides $17_1$, $17_2$ of the body 60 of the mid-roller $50_i$. In this embodiment, the rim portion 64 comprises shoulders $15_1$, $15_2$ turning radially inwardly to form flanges $73_1$, $73_2$ such that edges $75_1$, $75_2$ of the rim portion 64 are located radially inward of the circumferential surface 72 of the body 60 of the mid-roller $50_i$. More particularly, in this example, the shoulders $15_1$, $15_2$ turn radially inwardly by curving radially inward (e.g., such that the flanges $73_1$, $73_2$ are "curls"). In other examples, the shoulders $15_1$, $15_2$ may turn radially inward by being slanted or otherwise angled radially inward and/or may be partially curved radially inward and partially slanted or otherwise angled radially inward (i.e., may comprise one or more curved segments and one or more angled segments). The rim portion 64 may be configured in various other ways in other embodiments (e.g., the rim portion 64 may not comprise any shoulder such as the shoulders $15_1$, $15_2$).

In this embodiment, the circumferential surface 72 of the body 60 of the mid-roller $50_i$ is parallel to the widthwise direction of the mid-roller $50_i$. That is, when viewed in cross section, the circumferential surface 72 of the body 60 of the mid-roller $50_i$ is flat.

The radially-extending portion 65 of the body 60 of the mid-roller $50_i$ constitutes the radially-extending portion 34 of the mid-roller $50_i$. The radially-extending portion 65 interconnects the hub portion 63 and the rim portion 64. In this embodiment, the radially-extending portion 65 and the hub portion 63 of the body 60 of the mid-roller $50_i$ constitute a one-piece component that is secured (e.g., welded) to the rim portion 64 of the body 60 of the mid-roller $50_i$, which is another one-piece component. The one-piece component constituted by the radially-extending portion 65 and the hub portion 63 of the body 60 of the mid-roller $50_i$ may sometimes be referred to as a "disk". The radially-extending portion 65 may be configured in various other ways in other embodiments.

In this embodiment, the hub portion 63, the rim portion 64, and the radially-extending portion 65 of the body 60 of the mid-roller $50_i$ define an internal void 37 of the mid-roller $50_i$ delimited by internal surfaces $39_1$-$39_3$ of the body 60 of the mid-roller $50_i$.

The body 60 of the mid-roller $50_i$ is made of one or more materials. In some cases, the body 60 of the mid-roller $50_i$ may comprise a single material making up an entirety of the body 60. In other cases, the body 60 of the mid-roller $50_i$ may comprise two or more different materials that make up different parts of the body 60.

In this embodiment, the body 60 of the mid-roller $50_i$ is metallic, i.e., is at least mainly (i.e., mainly or entirely) made of a metallic material. The metallic material is selected to provide strength and rigidity to the mid-roller $50_i$. For example, in this case, the metallic material comprises steel. In other cases, the metallic material may comprise another metal instead of steel. In other embodiments, the body 60 of the mid-roller $50_i$ may be at least mainly made of another type of material (e.g., composite material, polymeric material, or ceramic material). Also, in other embodiments, different parts of the body 60 may be made of two or more materials (e.g., two types of steel).

Also, in this embodiment, at least part of the body 60 of the mid-roller $50_i$ is stamped into shape. That is, at least part of the body 60 of the mid-roller $50_i$ is formed by a stamping process. Notably, the rim portion 64, the hub portion 63 and the radially-extending portion 65 of the body 60 of the mid-roller $50_i$ may be stamped.

In this embodiment, the rim portion 64 of the body 60 of the mid-roller $50_i$ constitutes a first stamped component $81_1$, while the hub portion 63 and the radially-extending portion 65 of the body 60 of the wheel constitute a second one-piece component $81_2$ secured to the first one-piece component $81_1$ by any suitable means. For instance, the first stamped component $81_1$ and the second stamped component $81_2$ may be welded to one another (e.g., the second stamped component $81_2$ may be welded to the first stamped component $81_1$ or vice-versa).

The first stamped component $81_1$ may be manufactured by tube cutting and by then blasting the cut portion constituting the first stamped component $81_1$. That is, a portion of a tube is cut and then blasted, for instance by sand or by any other suitable material, in order to have a surface finish that will increase durability of the component.

The second stamped component $81_2$ may be punched, stamped, machined and blasted for finish. That is, a sheet of material may be punched to create a hole corresponding to the dimensions of the hub portion 63. The sheet of material may then be stamped to impart a shape to the sheet of material, the shape corresponding to the shape of the second stamped component $81_2$. The edges of the stamped sheet of material may be machined to provide more precise dimensions to the second stamped component $81_2$ and the stamped, machined sheet may be blasted, for instance by sand or by any other suitable material, in order to have a surface finish that will increase durability of the component.

The stamped components $81_1$, $81_2$ may be assembled by press fitting the second stamped component $81_2$ into the first stamped component $81_1$; by welding the stamped components $81_1$, $81_2$ to one another; by punching the openings $77_1$-$77_O$ of the hub portion 63; by curling the flanges $73_1$, $73_2$; by marking the assembly; and by blasting the assembly, for instance by sand or by any other suitable material, in order to have a surface finish that will increase durability of the component. Although in this embodiment the above-described steps are performed in the recited order to manufacture the body 60 of the mid-roller $50_i$, in other embodiments, the above-described steps may be performed in a different order and additional steps may also be performed to manufacture the body 60 of the mid-roller $50_i$.

The body 60 of the mid-roller $50_i$ may be manufactured in any other suitable way in other embodiments.

The covering 62 contacts the inner side 45 of the track 41 as the mid-roller $50_i$ rolls on the inner side 45 of the track 22. The covering 62 includes at least part (i.e., some but less than all, or all) of the circumferential surface 32 of the mid-roller $50_i$.

More specifically, in this embodiment, the covering 62 includes and thereby also defines the circumferential surface 32 in its entirety. The covering 62 may also form at least part of one of the sides $30_1$, $30_2$ of the mid-roller $50_i$ which faces a drive/guide lug $48_1$ in other embodiments.

The covering 62 covers at least part of the body 60 of the mid-roller $50_i$. In this embodiment, the covering 62 covers part of the rim portion 64 of the body 60 of the mid-roller $50_i$. More particularly, in this embodiment, the covering 62 covers the circumferential surface 72 of the body 60 of the mid-roller $50_i$.

The covering 62 may define the circumferential surface 32 of the mid-roller 50$_i$. In this embodiment, the covering 62 comprises corners 90$_1$, 90$_2$ and an intermediate portion 90$_3$ between the corners 90$_1$, 90$_2$ of the covering 62. More specifically, the intermediate portion 90$_3$ of the covering 62 may comprise the circumferential surface 32 of the mid-roller 50$_i$, including the lateral and intermediate portions 82, 84, 86. The intermediate portion 90$_3$ of the covering 62 may occupy a substantial portion of a width W$_C$ of the covering 62. For example, the covering 62 may occupy at least 40% of the width W$_C$ of the covering 62, in some embodiments at least 50% of the width W$_C$, in some embodiments at least 60% of the width W$_C$, in some embodiments at least 70% of the width W$_C$, in some embodiments at least 80% of the width W$_C$, in some embodiments at least 90% of the width W$_C$, in some embodiments at least 95% of the width W$_C$, in some embodiments even more (e.g. 99%).

In this embodiment, the covering 62 may also comprise the crown 92 and the apex 94. More particularly, in this embodiment, the crown 92 is generally centered onto the covering 62 in the widthwise direction of the mid-roller 50$_i$. That is, the apex 94 of the crown 92 may be located in a central portion of the covering 62. For example, in some embodiments, the apex 94 of the crown 92 may be located in a central third of the covering 62, in some embodiments in the central fifth of the covering 62, in some embodiments in the central seventh of the covering 62 and in some embodiments at a midpoint 99 of the covering 62 in the widthwise direction of the mid-roller 50$_i$.

In this embodiment, the covering 62 is generally centered over the mid-roller 50$_i$ such that the midpoint 99 of the covering 62 in the widthwise direction of the mid-roller 50$_i$ is the same as the midpoint of the mid-roller 50$_i$ in its widthwise direction.

The geometries of the corners 90$_1$, 90$_2$ of the covering 62 may differ. In particular, in this embodiment, the corner 90$_i$ is rounded (e.g. has a radius of curvature), while the corner 90$_2$ is beveled (i.e. defines an angle with the widthwise direction of the mid-roller 50$_i$). For example, in some embodiments, the radius of curvature of the corner 90$_1$ may be no more than 50 mm, in some embodiments no more than 40 mm, in some embodiments no more than 30 mm, in some embodiments no more than 20 mm, in some embodiments no more than 10 mm, in some embodiments even less. As another example, in some embodiments, the corner 90$_1$ may be rounded such that it has more than one radii of curvature or such that it has a variable radius of curvature, the radii of curvature or variable radius of curvature ranging between 2 mm and 100 mm, in some embodiments between 6 mm and 75 mm and in some embodiments between 12 mm and 50 mm.

In this embodiment, the corner 90$_2$ is beveled such that it defines an angle with the widthwise direction of the mid-roller 50$_i$ of at least 30°, in some embodiments of at least 45°, in some embodiments of at least 60°, in some embodiments of even more.

Alternatively, the corners 90$_1$, 90$_2$ of the covering 62 may both be curved. Alternatively, the corners 90$_1$, 90$_2$ of the covering 62 may both be beveled.

As another example, widths of the corners 90$_1$, 90$_2$ of the covering 62 may differ. For example, in some embodiments a difference of the widths of the corners 90$_1$, 90$_2$ of the covering 62 may be at least 1 mm, in some embodiments at least 5 mm, in some embodiments at least 10 mm, in some embodiments at least 15 mm, in some even more, and in some embodiments the difference may represent at least 5% of a given one of the widths, in some embodiments at least 10%, in some embodiments at least 50%, in some embodiments at least 100%, in some embodiments at least 200% and in some embodiments even more.

As another example, the radius of curvature of the crown 92 may greater than the radius of curvature of the rounded corner 90$_1$. In some embodiments, a ratio of the radius of curvature of the crown 92 over the radius of curvature of the rounded corner 90$_1$ may be no more than 100, in some embodiments no more than 70, in some embodiments no more than 50, in some embodiments no more than 30, in some embodiments no more than 20, in some embodiments no more than 15 and in some embodiments even less.

As the circumferential surface 72 of the body 60 of the mid-roller 50$_i$ is parallel to the widthwise direction of the mid-roller 50$_i$ (when viewed in cross section, the circumferential surface 72 of the body 60 of the mid-roller 50$_i$ is flat) and the circumferential surface 32 of the mid-roller 50$_i$ comprises a crown, notably, in this embodiment, a thickness T$_C$ of the covering 62 varies in the widthwise direction of the mid-roller 50$_i$. In particular, the thickness T$_C$ may reach a maximal value in the intermediate portion 90$_3$ of the covering 62 towards the apex 94 and reach minimal values in the corners 90$_1$, 90$_2$ of the covering 62. Similarly, in this embodiment, the thickness T$_C$ of the covering 62 at the intermediate track-contacting portion 86 is greater than at each of the lateral track-contacting portions 82, 84. For example, in some embodiments, a ratio of the thickness T$_C$ of the covering 62 at the intermediate track-contacting portion 86 over the thickness of the covering 62 at each of the lateral track-contacting portions 82, 84 may be at least 1.1, in some embodiments at least 1.25, in some embodiments at least 1.5, in some embodiments at least 2 and in some embodiments even more.

In this embodiment, the use of the covering 62 on the body 60 of the mid-roller 50$_i$ substantially reduces stress concentration on the track 41, as shown in FIG. 15B. That is, the covering 62 may reduce maximum stresses on the track 41 generated by the mid-roller 50$_i$. This may be quantified by any suitable way. For example, comparisons of stress concentrations on the track 41 when mid-rollers 50$_i$ including the covering 62 are used with stress concentrations on the track 41 when mid-rollers 50$_i$ including no covering are used or with stress concentrations on the track 41 when mid-rollers 50$_i$ including standard covering (e.g. without any crown 92) are used may be a suitable way to quantify maximum stress reductions provided by the covering 62 of the mid-roller 50$_i$. For instance, in some embodiments, the covering 62 may provide a reduction of stress concentration of at least 5%, in some embodiments of at least 10%, in some embodiments of at least 15%, in some embodiments of at least 20%, in some embodiments of at least 30%, and in some embodiments even more (e.g., at least 40%, at least 50%).

The covering 62 is made of one or more materials. In some cases, the covering 62 may comprise a single material making up an entirety of the covering 62.

A material of the covering 62 is different from a material of the body 60 of the mid-roller 50$_i$. That is, the material of the covering 62 and the material of the body 60 of the mid-roller 50$_i$ may belong to different classes of materials (i.e., metals, polymers, ceramics and composites) and/or may substantially differ in terms of one or more properties, such as strength, elasticity, hardness, friction coefficient, etc. For instance, in some cases: a strength (e.g., yield strength) of the wheel body material may be different from (e.g., greater than) a strength of the covering material; a modulus of elasticity of the covering material may be different from (e.g., less than) a modulus of elasticity of the wheel body material; an abrasion resistance of the covering material may be different from (e.g., greater than) an abrasion resistance of the wheel body material; a coefficient of friction of the covering material with the track 22 may be different from (e.g., less than) a coefficient of friction of the wheel body material with the track 22; etc.

A material of the covering 62 can be selected to provide desired properties to the covering 62. For example, the covering 62 may be less hard (i.e., have a lower hardness) and/or be more elastic (i.e., have a lower modulus of elasticity) than the body 60 of the mid-roller $50_i$. As another example, in order to reduce friction and heat generation, the covering 62 have a low coefficient of friction with the track 41 and a high thermal conductivity. The coefficient of friction of the covering 62 with the track 41 may thus be lower than the coefficient of friction of the body 60 of the mid-roller $50_i$ with the track 41. Considering convective heat transfer associated with the shape of the covering 62, the thermal conductivity of the covering material may provide the covering 62 with a high thermal transmittance.

In this embodiment, the covering 62 is polymeric, i.e., at least mainly (i.e., mainly or entirely) made of a polymeric material 78. The polymeric material 78 may be selected, for instance, to create a low-friction interface between the mid-roller $50_i$ and the inner side 45 of the track 41, to enhance an abrasion resistance of the mid-roller $50_i$, and/or to enhance a vibration absorption capacity of the mid-roller $50_i$. In some examples of implementation, the polymeric material 78 may be elastomeric material such that the covering 62 is an elastomeric covering. In other examples of implementation, the polymeric material 78 may be nonelastomeric material such that the covering 62 is a nonelastomeric covering. For example, in this case, the polymeric material 78 comprises polyurethane (e.g., polyurethane elastomer). In other cases, the polymeric material 78 may comprise another polymer instead of polyurethane (e.g., polytetrafluoroethylene (PTFE) (Teflon™), ultra-high-molecular-weight polyethylene (UHMW), thermoplastic polyolefin (TPO), etc.). In other embodiments, the covering 62 may be at least mainly made of another type of material (e.g., metallic material, ceramic material or composite material). Also, in other embodiments, different parts of the covering 62 may be made of two or more covering materials (e.g., two types of polymers).

The covering 62 may be provided on the body 60 of the mid-roller $50_i$ in various ways. For example, in some embodiments, the covering 62 may be a molded covering that is molded onto the body 60 of the mid-roller $50_i$ during manufacturing of the mid-roller $50_i$. The covering 62 may be provided on the body 60 of the mid-roller $50_i$ in other manners in other embodiments (e.g., adhesively bonded to the body 60, coated on the body 60, mechanically fastened to the body 60 with bolts or other fasteners, etc.).

In other embodiments, the radius of curvature of the circumferential surface 32 of the mid-roller $50_i$ in the widthwise direction of the mid-roller $50_i$ may be variable.

The track system $16_i$, including the mid-roller $50_i$, may be implemented in various other ways in other embodiments.

For example, in some embodiments, the covering 62 of the mid-roller $50_i$ may be implemented in any other suitable way in other embodiments.

Figure 16:
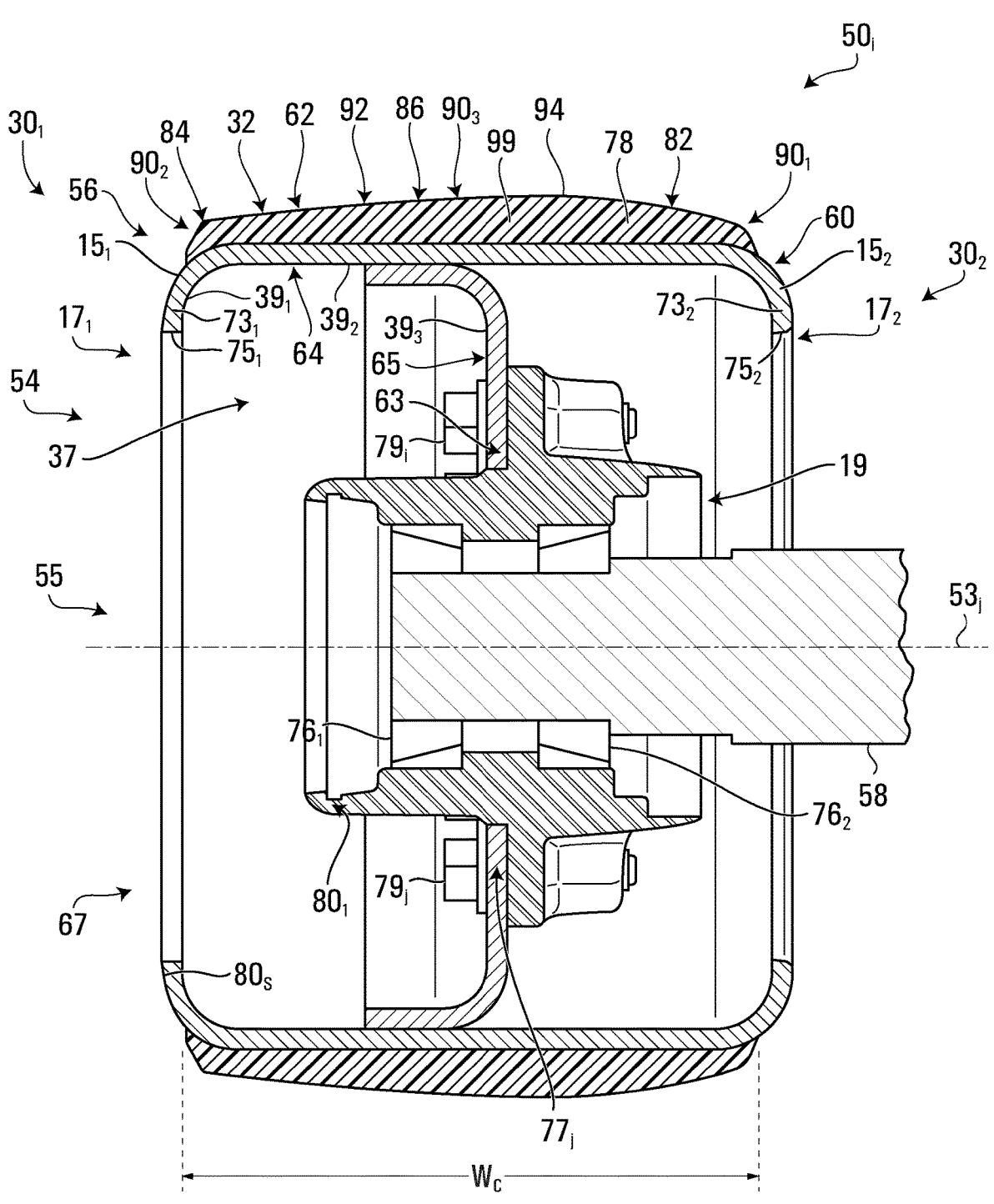
FIGS. 16 to 24 show variants of the mid-roller.

For instance, in some embodiments, as shown in FIG. 16, the covering 62 may be decentered over the mid-roller $50_i$ such that the midpoint 99 of the covering 62 in the widthwise direction of the mid-roller $50_i$ is not the same as the midpoint of the mid-roller $50_i$ in its widthwise direction. In this embodiment, the apex 94 of the crown 92 of the mid-roller $50_i$ is decentered, i.e. is disposed closer to a given of the lateral sides $30_1$, $30_2$ than to the other one of the lateral sides $30_1$, $30_2$. In some embodiments, the apex 94 of the crown 92 of the mid-roller $50_i$ is closer to an inboard lateral side, while in other embodiments the apex 94 of the crown 92 of the mid-roller $50_i$ is closer to an outboard lateral side.

Figure 17:
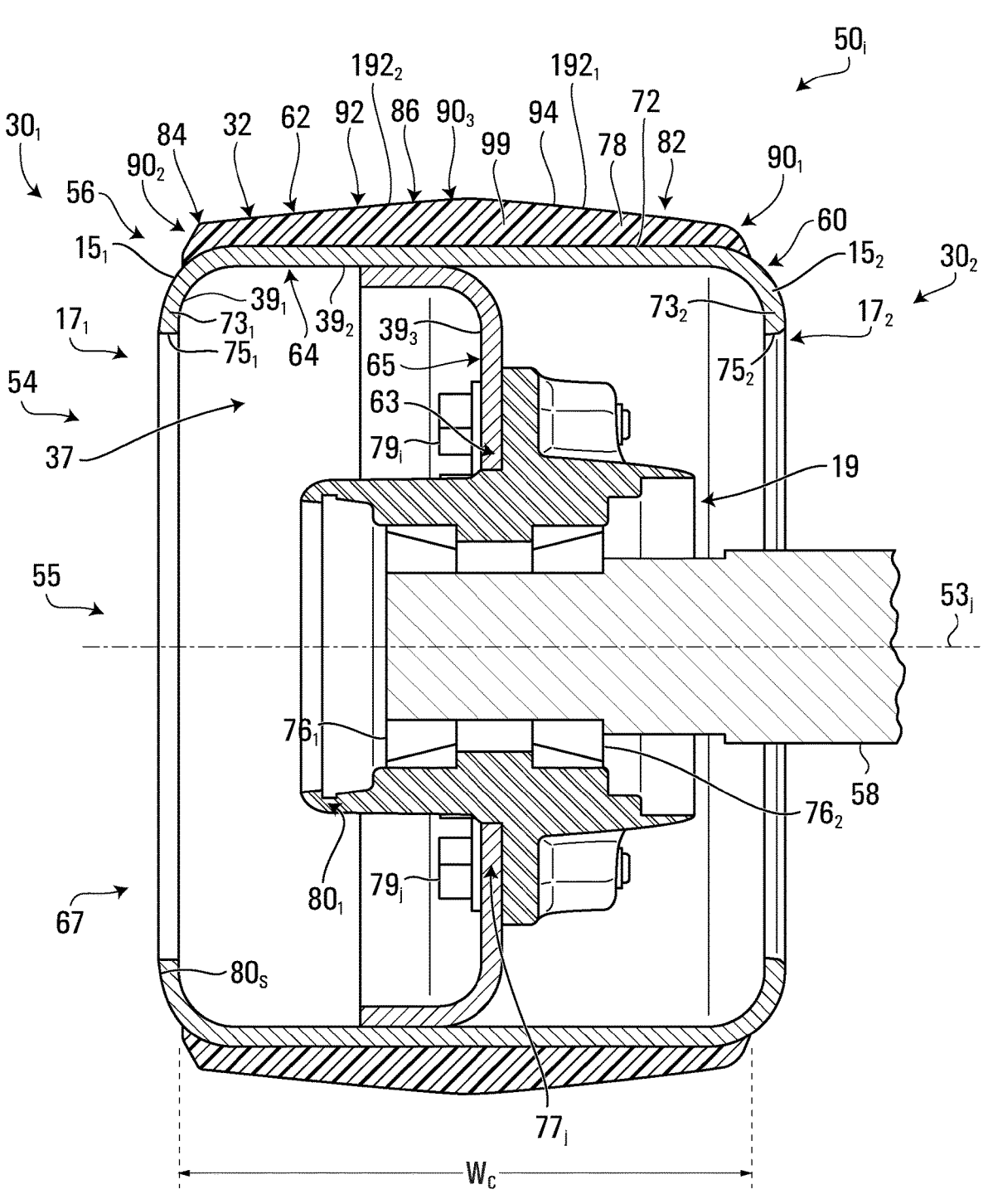

In some embodiments, as shown in FIG. 17, the covering 62 comprises tapered portions $192_1$, $192_2$ that are tapered towards opposite directions. In this embodiment, the tapered portions $192_1$, $192_2$ define the apex 94, wherein a radial dimension of the mid-roller $50_i$ is maximal. The tapered portions $192_1$, $192_2$ may be tapered to any suitable angle. For example, the taper angles of the tapered portions $192_1$, $192_2$ relative to the axis $53_i$ of the mid-roller $50_i$ may be at least 2°, in some embodiments at least 4°, in some embodiments at least 6°, in some embodiments at least 8°, in some embodiments at least 10°, and in some embodiments even more. In this embodiment, the taper angles of the tapered portions $192_1$, $192_2$ are equal, while in other embodiments the taper angles of the tapered portions $192_1$, $192_2$ differ. Moreover, in this embodiment, the apex 94 is centered in the widthwise direction of the mid-roller $50_i$, and the apex 94 is located in the central portion of the mid-roller $50_i$. In other embodiments, the apex 94 may be decentered in the widthwise direction of the mid-roller $50_i$.

Figure 18:
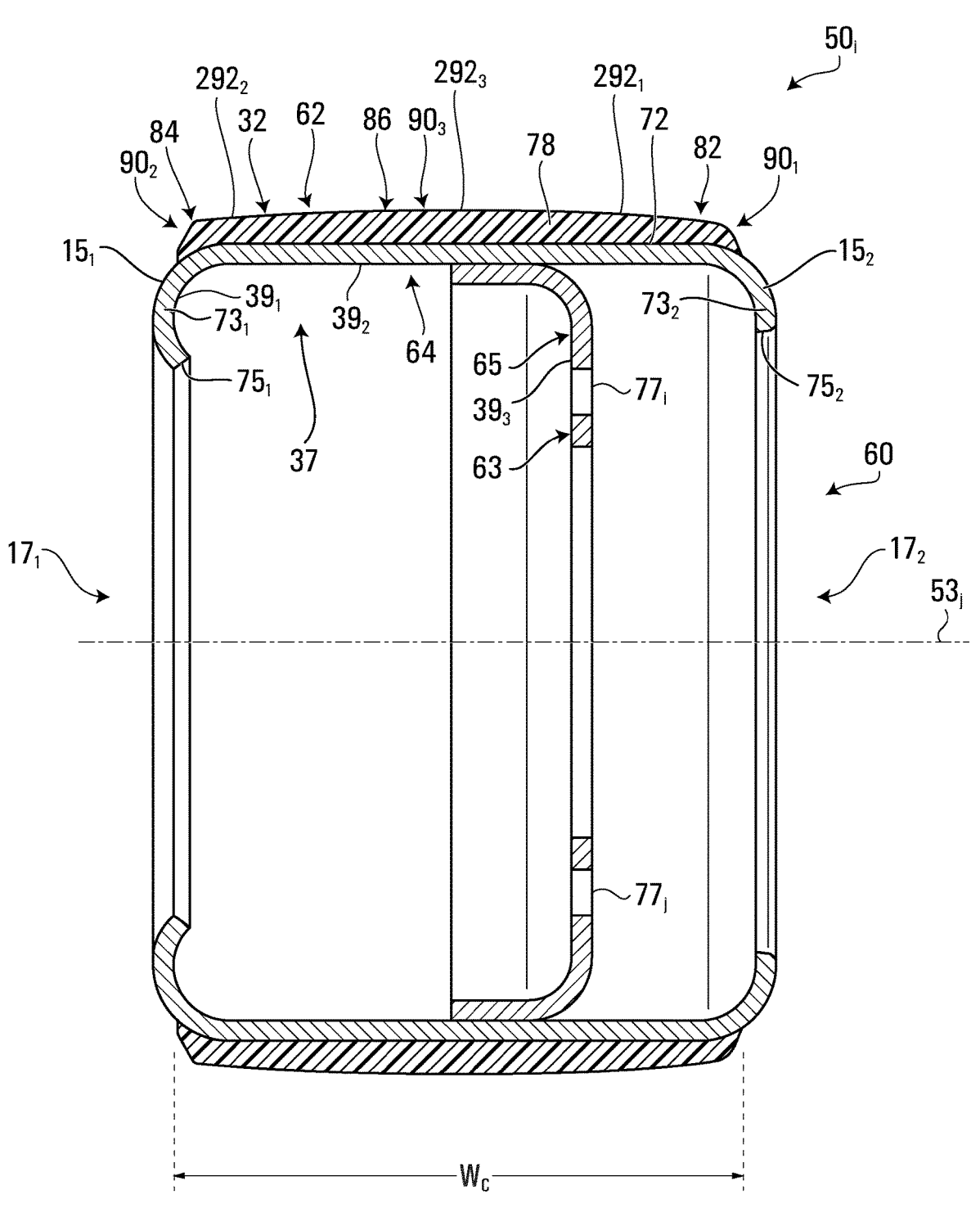

In some embodiments, as shown in FIG. 18, the covering 62 may comprise crowned portions $292_1$, $292_2$ and a flat portion $292_3$. That is, when viewed in cross section, the portion $292_3$ of the covering 62 of the mid-roller $50_i$ is flat. In this embodiment, the flat portion $292_3$ of the covering 62 is disposed between the crowned portions $292_1$, $292_2$ and the radial dimension of the mid-roller $50_i$ is maximal at the flat portion $292_3$. In other embodiments, a given one or both of the portions $292_1$, $292_2$ may be tapered rather than crowned (i.e. curved).

Figure 19:
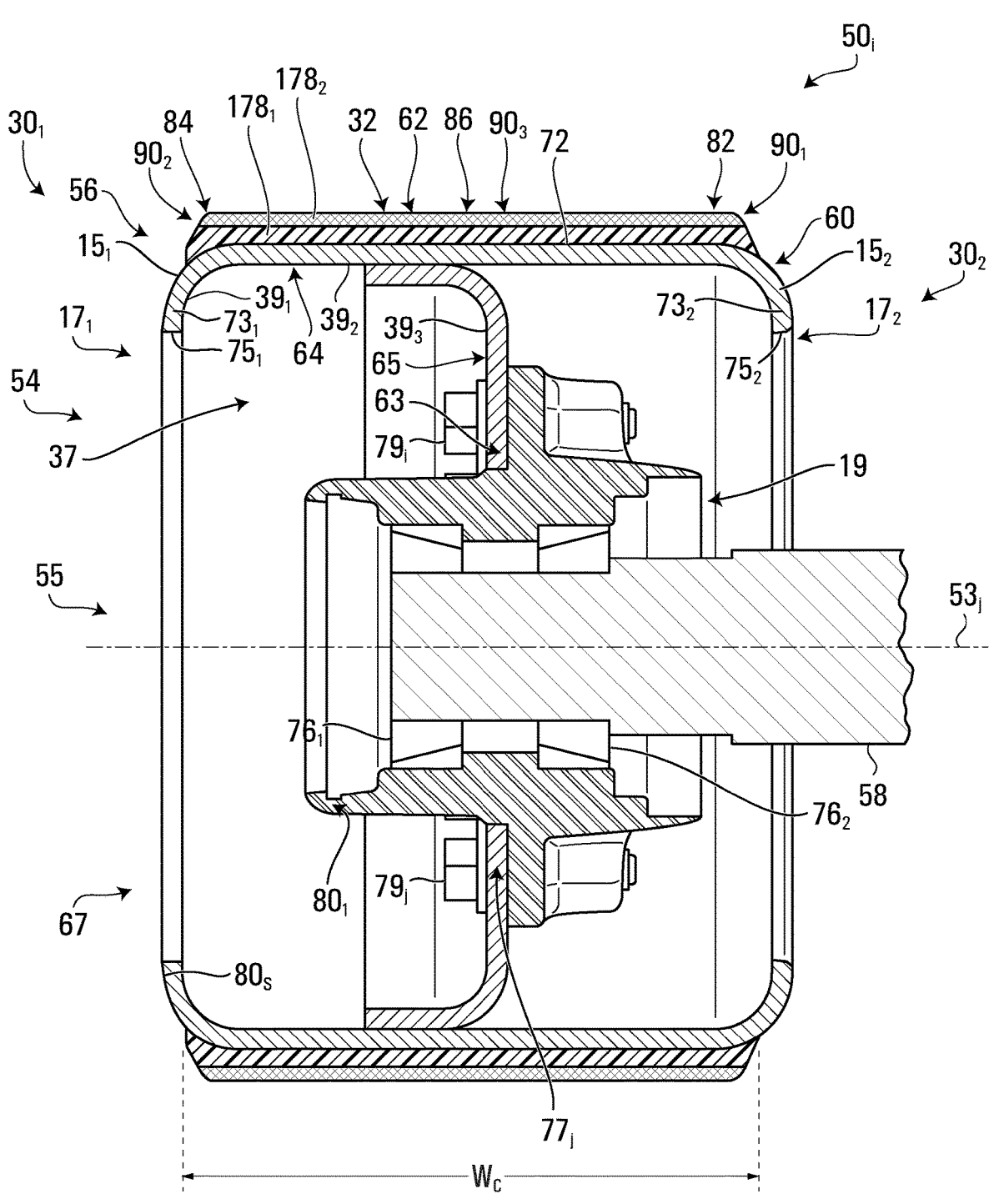
Figure 20:
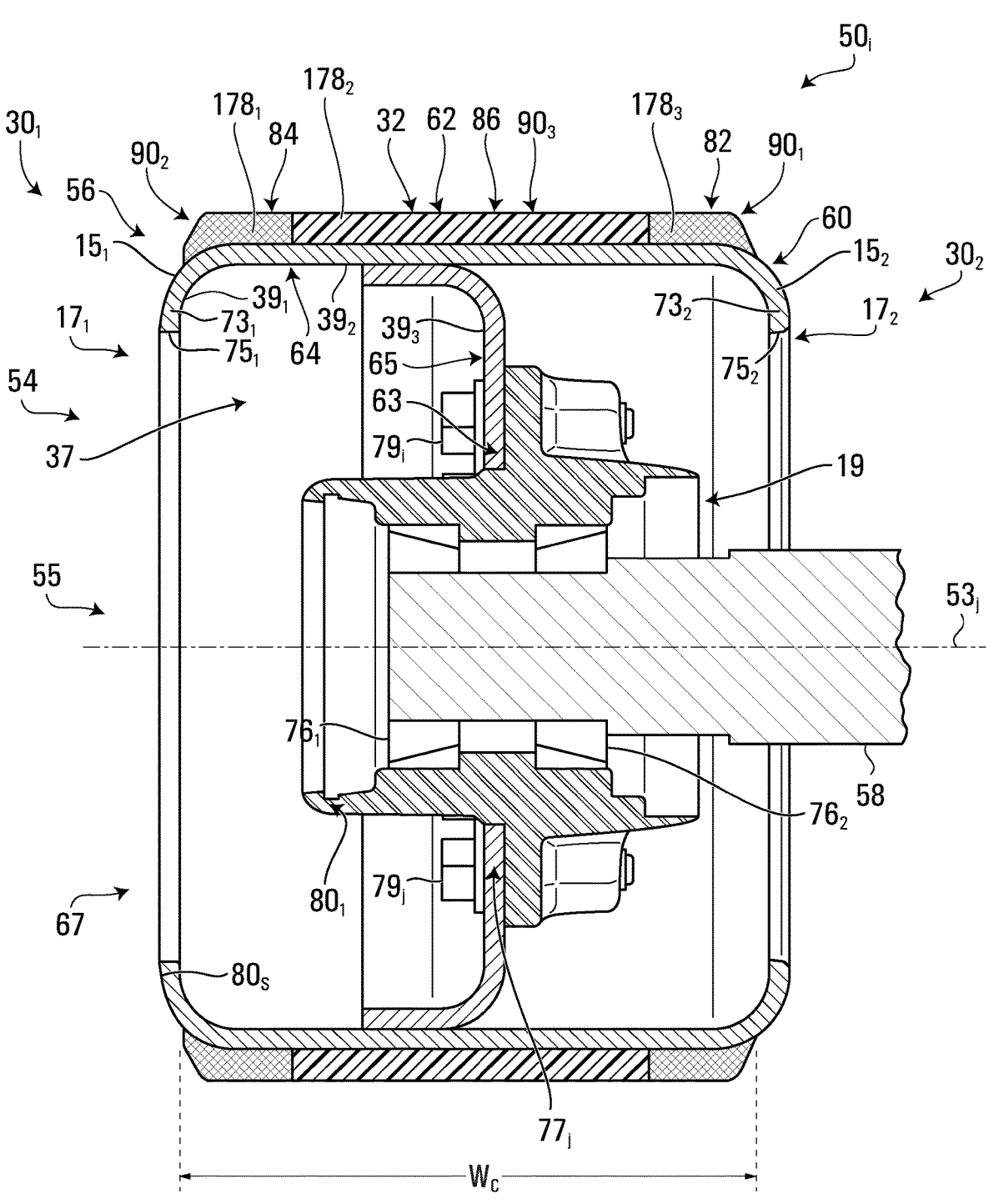

In some embodiments as shown in FIGS. 19 and 20, the covering 62 comprises portions comprising different materials. That is, rather than comprising the polymeric material 78, the covering 62 comprises a plurality of polymeric materials $178_1$-$178_m$ disposed in different parts of the covering 62. The polymeric materials $178_1$-$178_m$ may be disposed one over another in the radial direction of the mid-roller $50_i$, as shown in FIG. 19. The polymeric materials $178_1$-$178_m$ may also be disposed one next to the other in the widthwise direction of the mid-roller $50_i$, as shown in FIG. 20. Mechanical properties (e.g., hardness, rigidity, elongation at break, density, etc.) of the polymeric materials $178_1$-$178_m$ may differ for each one of the polymeric materials $178_1$-$178_m$, in order to provide a light yet durable covering which reduces stress concentration in the track 41.

As another example, in some embodiments, the body 60 of the mid-roller $50_i$ may be implemented in any other suitable way in other embodiments.

Figure 21:
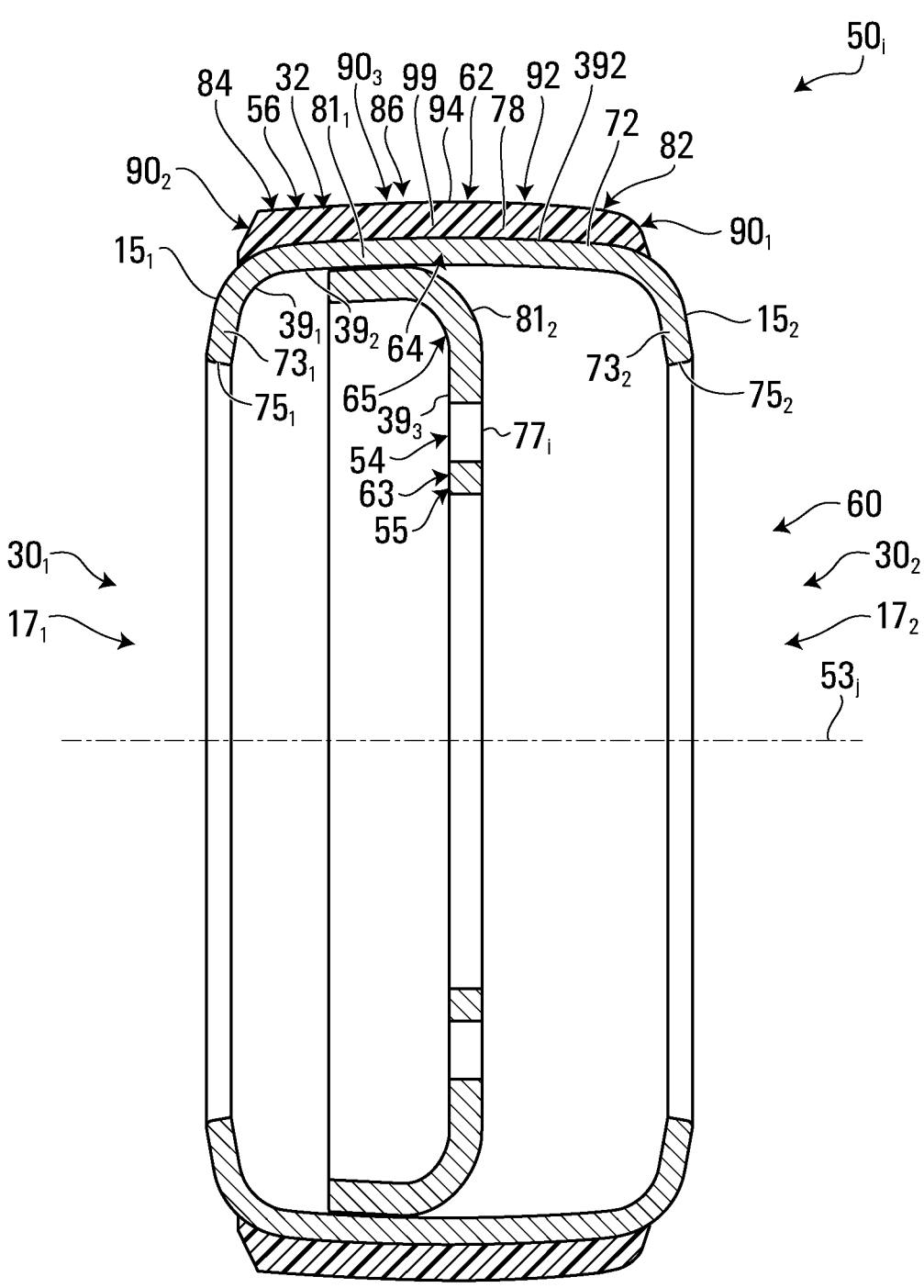
Figure 22:
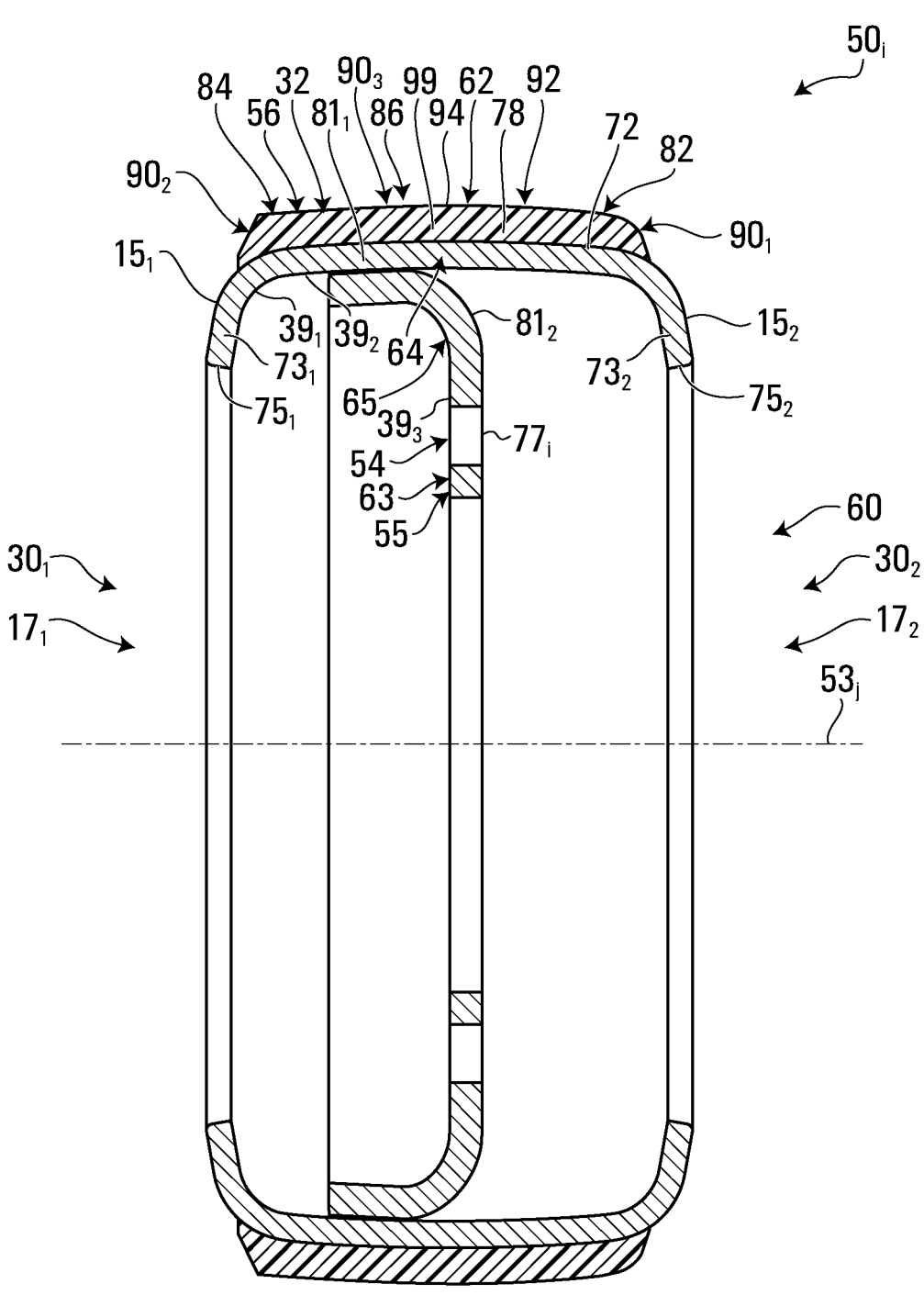

For instance, in some embodiments, as shown in FIG. 21, the circumferential surface 72 of the body 60 of the mid-roller $50_i$ may comprise a crown 392. That is, when viewed in cross section, the circumferential surface 72 of the body 60 of the mid-roller $50_i$ is not flat but rather crowned. In this embodiment, the crown 392 is substantially parallel to the crown 92 of the circumferential surface 32 of the mid-roller $50_i$, such that the covering 62 still defines a crown 92 of the circumferential surface 32 of the mid-roller $50_i$ but has a substantially constant thickness. Moreover, in this embodiment, the component $81_1$ which defines the rim portion 64 of the body 60 has a constant thickness. That is, when viewed in cross section, an inner surface of the rim portion of the body 60 opposite to the circumferential surface 72 of the body 60 of the mid-roller 50$_i$ is also not flat but rather crowned. In other embodiments, with additional reference to FIG. 22, the component 81$_1$ which defines the rim portion 64 of the body 60 has a varying thickness. In this case, the inner surface of the rim portion of the body 60 opposite to the circumferential surface 72 of the body 60 of the mid-roller 50$_i$ may be flat.

Figure 23:
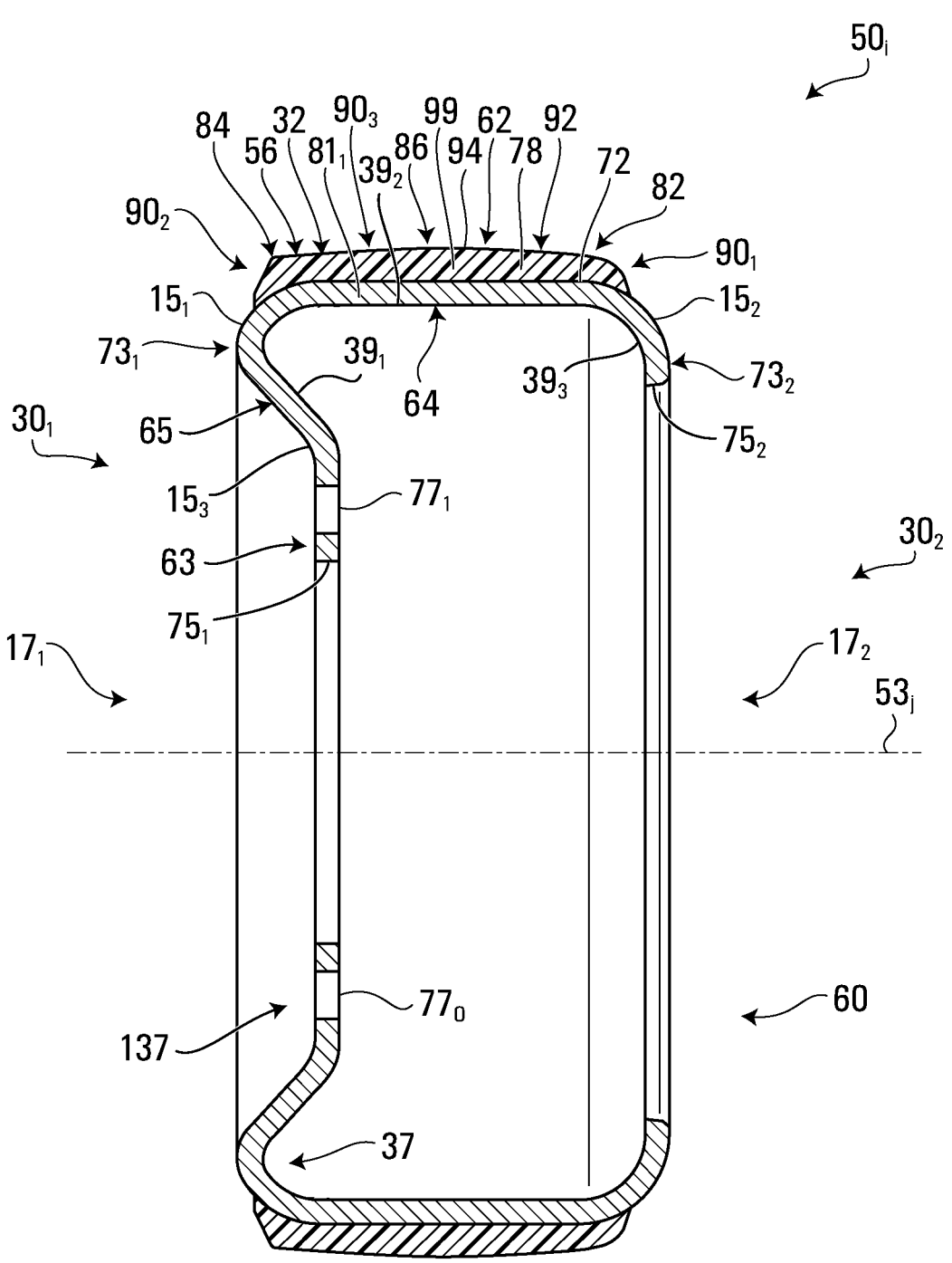

In some embodiments, as shown in FIG. 23, the rim portion 64, the hub portion 63 and the radially-extending portion 65 of the body 60 of the mid-roller 50$_i$ may constitute a one-piece component 81. In this example, the body 60 of the mid-roller 50$_i$ may be viewed as a "single piece" body. In this example, the radially-extending portion 65 of the body 60 extends radially inwardly from the shoulder 15$_1$ of the body 60 of the mid-roller 50$_i$ and connects the hub portion 63 to the rim portion 64. As such, the radially-extending portion 65 and the hub portion 63 of the body 60 are part of the flange 73$_1$. In this example, the angle defined by the shoulder 15$_1$ is less than 90 degrees such that the radially-extending portion 65 of the body 60 creates a recess 137 and the body 60 of the mid-roller 50$_i$ comprises a shoulder 153 such that the inner and outer surfaces of the hub portion 63 of the body 60 are substantially perpendicular to the axis 53$_1$ of the mid-roller 50$_i$.

In this embodiment, the body 60 of the mid-roller 50$_i$ may be manufactured by punching, blanking, stamp shaping, machining, curling, punching, marking and/or blasting. For instance, a sheet of material may be punched and/or blanked to create a hole corresponding to the dimensions of the hub portion 63. The sheet of material may then be stamped to impart a shape to the sheet of material, the shape generally corresponding to the shape of the body 60. The edges of the stamped sheet of material may be machined to provide more precise dimensions to the body 60. The stamped, machined sheet may be then be curled to form the flanges 73$_1$-73$_3$ and punched to form the openings 77$_1$-77$_O$ of the hub portion 63. The sheet of material may be marked and blasted, for instance by sand or by any other suitable material, in order to have a surface finish that will increase durability of the component. Although in this embodiment the above-described steps are performed in the recited order to manufacture the body 60 of the mid-roller 50$_i$, in other embodiments, the above-described steps may be performed in a different order and additional steps may also be performed to manufacture the body 60 of the mid-roller 50$_i$.

Figure 24:
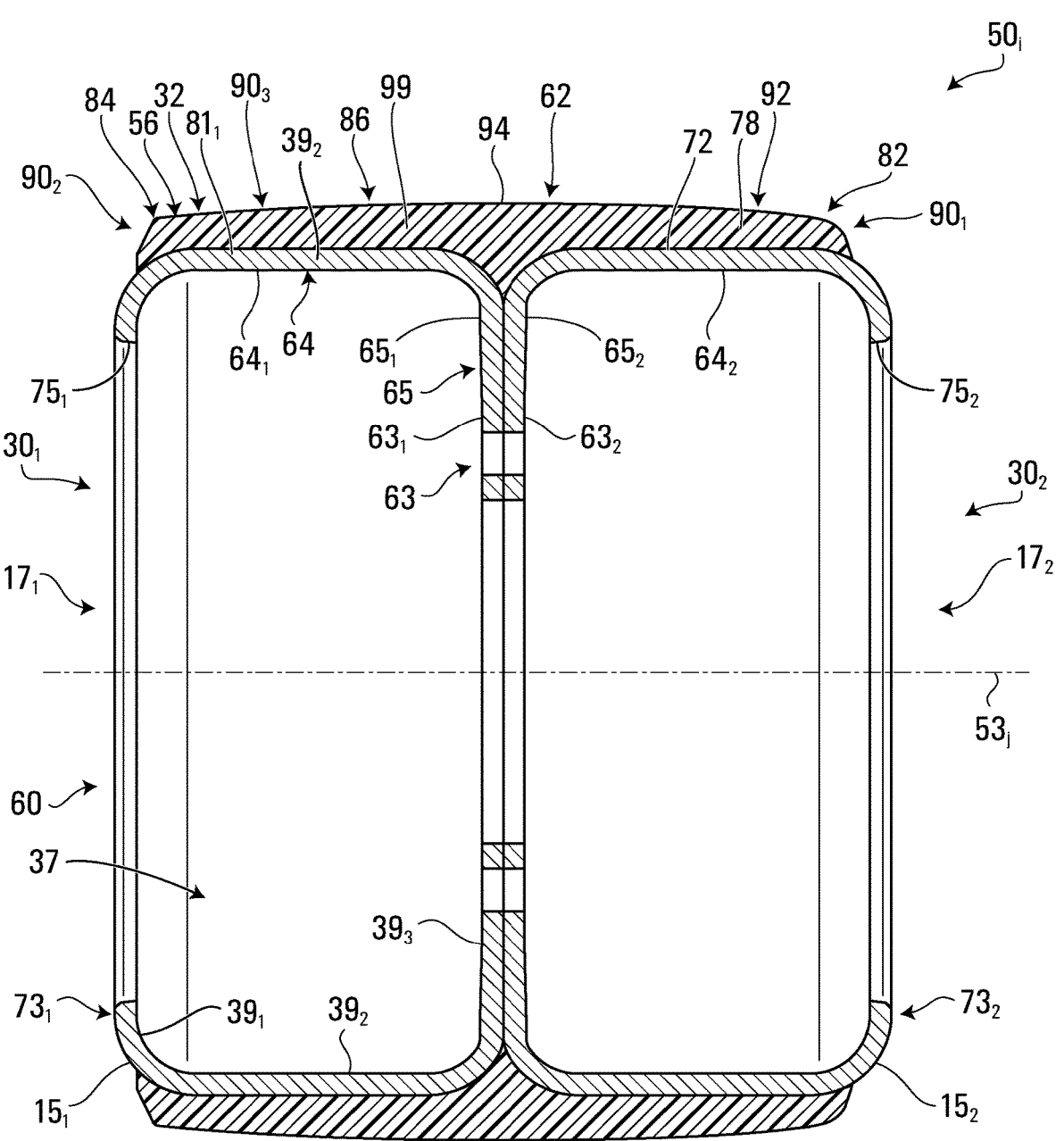

In some embodiments, as shown in FIG. 24, the body 60 of the mid-roller 50$_i$ comprises two one-piece components 81$_1$, 81$_2$ affixed to one another (e.g., by welding), each of the two components 81$_1$, 81$_2$ forming a part of the rim portion 64, the hub portion 63 and the radially-extending portion 65 of the body 60. That is, the one-piece component 81$_1$ comprises a rim portion 64$_1$, a hub portion 63$_1$ and a radially-extending portion 65$_1$; the one-piece component 81$_2$ comprises a rim portion 64$_2$, a hub portion 63$_2$ and a radially-extending portion 65$_2$; the rim portions 64$_1$, 64$_2$ are part of the rim portion 64; the hub portions 63$_1$, 63$_2$ are part of the hub portion 63; and the radially-extending portions 65$_1$, 65$_2$ are part of the radially-extending portion 65. In this example, the body 60 of the mid-roller 50$_i$ may be viewed as a "twin halves" body. In this example, the flange 73$_1$ is formed by the one-piece component 81$_1$ and the flange 73$_2$ is formed by the one-piece component 81$_2$. In this example, also, the one-piece components 81$_1$, 81$_2$ are identical components that are welded to one another, such that the body 60 of the mid-roller 50$_i$ is symmetrical relative to a plane perpendicular to the axis 53$_1$ and located between the one-piece components 81$_1$, 81$_2$.

In this embodiment, the body 60 of the mid-roller 50$_i$ may be manufactured in a similar manner as a "single piece" body, but additional manufacturing steps may be required. The additional steps for assembling the one-piece components 81$_1$, 81$_2$ may include, for instance, welding the one-piece components 81$_1$, 81$_2$ to one another and blasting the assembly, for instance by sand or by any other suitable material, in order to have a surface finish that will increase durability of the component.

Although the wheel 50$_i$ illustrated in FIGS. 8 to 14 is a mid-roller wheel, different types wheels (e.g., leading idler wheels, trailing idler wheels) may implement improvements based on principles disclosed herein.

Although the agricultural vehicle 10 illustrated in FIG. 1 is an agricultural tractor comprising four track systems 16$_1$-16$_4$, different types of agricultural vehicles configured differently (e.g., having a different number of track systems) may implement improvements based on principles disclosed herein.

Figure 27:
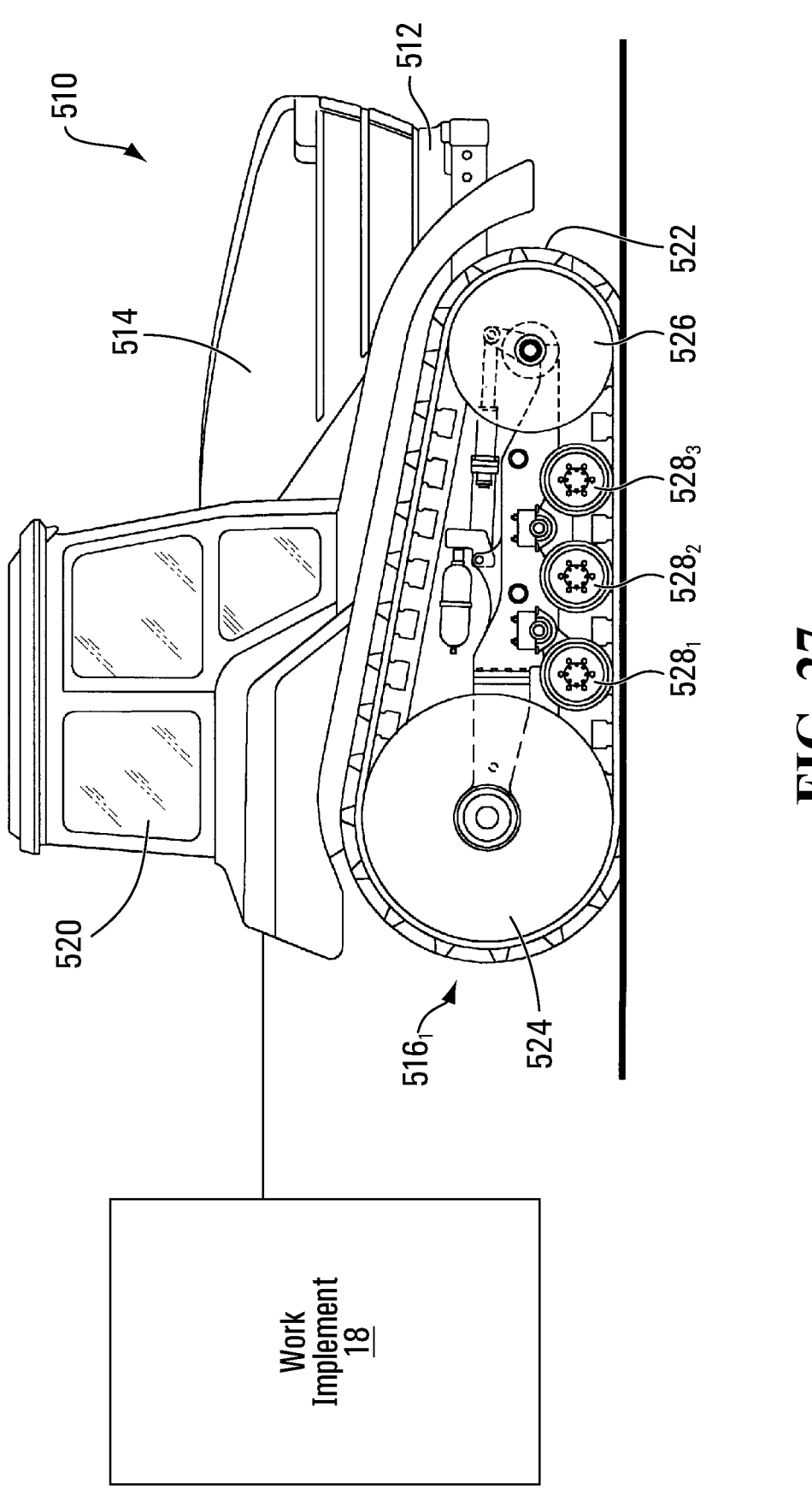
FIG. 27 shows an example of an agricultural vehicle comprising two track systems.

For instance, with additional reference to FIG. 27, an agricultural vehicle 510 may be provided comprising two track systems 516$_1$, 516$_2$ rather than four (i.e., one track system 516$_i$ at each side of the agricultural vehicle 510). The agricultural vehicle 510 also comprises a frame 512, a prime mover 514, and an operator cabin 520 and can be equipped with the work implement 18 to perform agricultural work. Each track system 516$_i$ comprises a drive wheel 524 at a first longitudinal end portion of the track system 516$_i$, an idler wheel 526 at a second longitudinal end portion of the track system 516$_i$ opposite to the first longitudinal end portion, and a plurality of roller wheels 528$_1$-528$_6$ intermediate the drive wheel 524 and the idler wheel 526. The track system 516$_i$ further comprises a track 522 disposed around the wheels 524, 526, 528$_1$-528$_6$ and driven by the drive wheel 524. The track system 516$_i$ may implement the lateral load distribution mechanism 100 as described in section 1 above. Additionally or alternatively, the track 522 may be configured in a manner similar to the track 22 as described in section 2 above.

Figure 28:
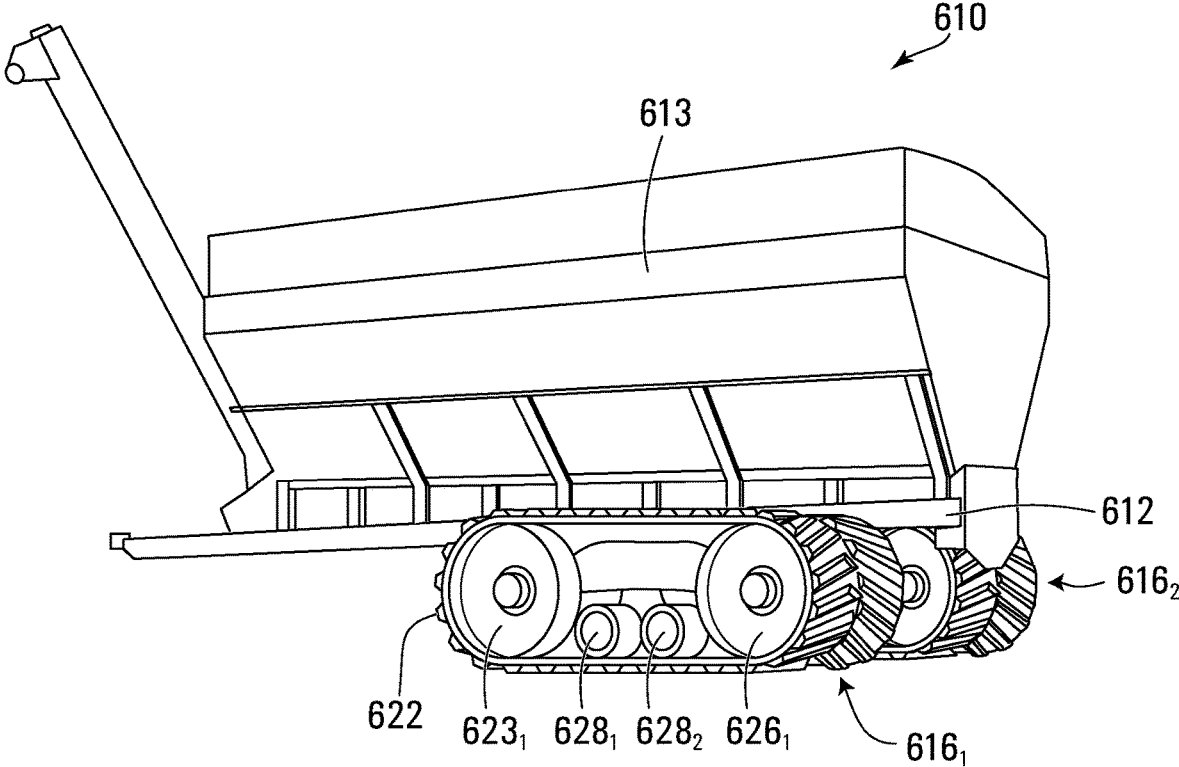
FIG. 28 shows an example of a trailed vehicle configured to be attached to the agricultural vehicle of FIG. 1 or 27.

In some embodiments, the work implement 18 that is drawn by the agricultural vehicle 10 may implement features disclosed herein in respect of the agricultural vehicle 10, including wheels such as the mid-roller 50$_i$. For instance, with additional reference to FIG. 28, the work implement 18 may comprise a trailed vehicle 610 (e.g., a cart) comprising a frame 612, a trailer body 613 (e.g., a container) and track systems 616$_1$, 616$_2$. In this example, the trailed vehicle 610 is a harvest cart. In other examples, the trailed vehicle 610 may be a fertilizer cart, a sprayer, a planter or any other suitable type of trailed vehicle. Each track system 616$_i$ of the trailed vehicle 610 comprises front (i.e., leading) idler wheels 623$_1$, 623$_2$ at a first longitudinal end portion of the track system 616$_i$, rear (i.e., trailing) idler wheels 626$_1$, 626$_2$ at a second longitudinal end portion of the track system 616$_i$ opposite the first longitudinal end portion, and a plurality of roller wheels 628$_1$-628$_4$ intermediate the front idler wheels 623$_1$, 623$_2$ and the rear idler wheels 626$_1$, 626$_2$. The track system 616$_i$ further comprises a track 641 disposed around the wheels 626$_1$, 626$_2$, 626$_1$, 626$_2$, 628$_1$-628$_4$. One or more of the wheels 626$_1$, 626$_2$, 626$_1$, 626$_2$, 628$_1$-628$_4$ may comprise a body similar to the body 60 as described above.

In this example, the trailed vehicle 610 is not motorized in that it does not comprise a prime mover for driving the track systems 616$_1$, 616$_2$. Rather, the trailed vehicle 610 is displaced by the agricultural vehicle 10 to which the trailed vehicle 610 is attached. However, in some examples, the trailed vehicle 610 may be motorized. That is, the trailed vehicle 610 may comprise a prime mover for driving a drive wheel of each track system 616$_i$. For example, instead of comprising rear idler wheels 626$_1$, 626$_2$, the track system 616$_i$ may comprise a drive wheel for driving the track 622.

While in embodiments considered above the vehicle 10 is an agricultural vehicle operable by a user from the operator cabin 20, in some embodiments, the vehicle 10 may be operable by a user remotely. In some embodiments, the vehicle 10 may comprise autonomy features, allowing the vehicle 10 to be semi-autonomous and/or entirely autonomous. In some embodiments, the vehicle 10 may be free of any operator cabin.

While in embodiments considered above the vehicle 10 is an agricultural vehicle, in other embodiments, the vehicle 10 may be an industrial vehicle such as a construction vehicle (e.g., a loader, a telehandler, a bulldozer, an excavator, etc.) for performing construction work or a forestry vehicle (e.g., a feller-buncher, a tree chipper, a knuckleboom loader, etc.) for performing forestry work, a military vehicle (e.g., a combat engineering vehicle (CEV), etc.) for performing military work, an all-terrain vehicle (ATV), a snowmobile, or any other vehicle operable off paved roads. Although operable off paved roads, the vehicle 10 may also be operable on paved roads in some cases.

Certain additional elements that may be needed for operation of some embodiments have not been described or illustrated as they are assumed to be within the purview of those of ordinary skill in the art. Moreover, certain embodiments may be free of, may lack and/or may function without any element that is not specifically disclosed herein.

Any feature of any embodiment discussed herein may be combined with any feature of any other embodiment discussed herein in some examples of implementation.

In case of any discrepancy, inconsistency, or other difference between terms used herein and terms used in any document incorporated by reference herein, meanings of the terms used herein are to prevail and be used.

Although various embodiments and examples have been presented, this was for purposes of description, but should not be limiting. Various modifications and enhancements will become apparent to those of ordinary skill in the art.

The invention claimed is:

1. A wheel for a track system of a vehicle, the track system comprising a track-engaging assembly that includes the wheel and a track movable around the track-engaging assembly, the track being elastomeric to flex around the track-engaging assembly, the track comprising a ground-engaging outer surface for engaging the ground and an inner surface opposite to the ground-engaging outer surface, the wheel comprising:
a body including a rim portion and a hub portion;
a covering affixed to the body of the wheel;
a first lateral side and a second lateral side opposed to one another; and
a circumferential surface disposed between the first lateral side and the second lateral side and configured to contact the inner surface of the track, the covering including the circumferential surface and comprising:
a first tapered portion tapered toward the first lateral side;
a second tapered portion tapered toward the second lateral side;
wherein the first and second tapered portions define an apex wherein a radial dimension of the wheel is maximal, the apex being centered in the widthwise direction of the wheel and is located in a central portion of the wheel.

2. The wheel of claim 1, wherein a taper angle of at least one of the first and second tapered portions relative to an axis of the wheel is at least 2°.

3. The wheel of claim 1, wherein the body of the wheel is a metallic body and the covering is a polymeric covering.

4. The wheel of claim 1, wherein taper angles of the first and second tapered portions are equal.

5. The wheel of claim 1, wherein the covering is asymmetrical about a midpoint of the covering in the widthwise direction of the wheel.

6. The wheel of claim 1, wherein: the covering includes a first corner adjacent to the first lateral side of the wheel and a second corner adjacent to the second lateral side of the wheel; and the first corner and the second corner of the covering are shaped differently.

7. The wheel of claim 1, wherein the covering includes a rounded corner adjacent to the first lateral side of the wheel.

8. The wheel of claim 1, wherein: the track comprises a plurality of wheel-contacting projections projecting from the inner surface of the track; the wheel is configured to roll on a part of the inner surface of the track from a lateral edge of the track to the wheel-contacting projections; and the circumferential surface occupies at least a majority of a width of the part of the inner surface of the track from the lateral edge of the track to the wheel-contacting projections.

9. A track system comprising the wheel of claim 1.

10. A wheel for a track system of a vehicle, the track system comprising a track-engaging assembly that includes the wheel and a track movable around the track-engaging assembly, the track being elastomeric to flex around the track-engaging assembly, the track comprising a ground-engaging outer surface for engaging the ground and an inner surface opposite to the ground-engaging outer surface, the wheel comprising:
a body including a rim portion and a hub portion;
a covering affixed to the body of the wheel;
a first lateral side and a second lateral side opposed to one another; and
a circumferential surface disposed between the first lateral side and the second lateral side and configured to contact the inner surface of the track, the covering including the circumferential surface;
wherein the covering comprises first and second portions made of different materials, the first and second portions being one of disposed one over another in a radial direction or one next to the other in the widthwise direction.

11. The wheel of claim 10, wherein the first and second portions are made of different first and second polymeric materials.

12. The wheel of claim 11, wherein the first and second polymeric materials have different mechanical properties.

13. The wheel of claim 10, wherein the body of the wheel is a metallic body and the covering is a polymeric covering.

14. A wheel for a track system of a vehicle, the track system comprising a track-engaging assembly that includes the wheel and a track movable around the track-engaging assembly, the track being elastomeric to flex around the track-engaging assembly, the track comprising a ground-engaging outer surface for engaging the ground and an inner surface opposite to the ground-engaging outer surface, the wheel comprising:
a body including a rim portion and a hub portion;
a covering affixed to the body of the wheel;

a first lateral side and a second lateral side opposed to one another; and a circumferential surface disposed between the first lateral side and the second lateral side and configured to contact the inner surface of the track, the covering 5 including the circumferential surface and comprising:

a first tapered portion tapered toward the first lateral side;

a second tapered portion tapered toward the second lateral side; 10 wherein the first and second tapered portions define an apex wherein a radial dimension of the wheel is maximal, wherein a thickness of the covering varies in the widthwise direction of the wheel. 15

15. The wheel of claim 14, wherein the thickness of the covering at the apex of the circumferential surface is greater than the thickness of the covering at each of the first tapered portion and the second tapered portion of the circumferential surface. 20

16. The wheel of claim 14, wherein taper angles of the first and second tapered portions are equal.

17. The wheel of claim 16, wherein the taper angles of the first and second tapered portions relative to an axis of the wheel are at least 2°. 25

\* \* \* \* \*